United States Patent [19]

Piland

[11] Patent Number: 5,347,205

[45] Date of Patent: Sep. 13, 1994

[54] SPEED AND MODE CONTROL FOR A BLENDER

[75] Inventor: Clinton E. Piland, Henrico County, Va.

[73] Assignee: Hamilton Beach/ Proctor-Silex, Inc., Glen Allen, Va.

[21] Appl. No.: 944,048

[22] Filed: Sep. 11, 1992

[51] Int. Cl.$^5$ .............................................. H02P 5/28
[52] U.S. Cl. .................................. 318/811; 318/772; 388/904; 388/907.5; 388/936; 366/206; 366/601
[58] Field of Search ............................... 388/809–815, 388/836; 318/254, 138, 139, 772, 806–812; 328/904, 907.5, 935–337; 366/601, 206

[56] References Cited

U.S. PATENT DOCUMENTS

| | | | |
|---|---|---|---|
| 3,548,280 | 12/1970 | Cockroft | 259/108 |
| 3,678,288 | 7/1972 | Swanke et al. | 307/113 |
| 3,833,845 | 9/1974 | Smallbone et al. | |
| 3,924,169 | 12/1975 | Craft et al. | 318/245 |
| 3,951,351 | 4/1976 | Ernster et al. | 241/101.1 |
| 3,962,615 | 6/1976 | Spangler | |
| 4,459,524 | 7/1984 | Oota et al. | 318/484 |
| 4,568,193 | 2/1986 | Contri et al. | |
| 4,822,172 | 4/1989 | Stottmann | |
| 4,893,942 | 1/1990 | Stottmann | 388/827 |

OTHER PUBLICATIONS

Pamphlet "2001 Electronic Blender" Published 1978 by Hamilton Beach Division of Scovill, front cover p. 1, pp. 2–13 and back cover.

Hamilton Beach Div. Schematic Diagram 716 999 0110 Last Revised Nov. 5, 1982, 2 sheets.

Advertisement for Soft Touch Blendor, published by Waring Products Division in 1980.

Advertisement: "A Fresh New Spin on Blender Technology", published by Sunbeam-Oster in 1992.

4 Sheets of Artwork for a "Philips 2001 Computerized Blender" Marketed about 1980.

Primary Examiner—William M. Shoop, Jr.
Assistant Examiner—David Martin
Attorney, Agent, or Firm—Roger S. Dybvig

[57] ABSTRACT

A blender is provided with a microprocessor for controlling energization of the blender drive motor, and a plurality of manually actuated switches for controlling the stepping of the microprocessor through a program which determines the mode and pattern of energization of the drive motor. There are N speed range selection switches, M speed selection switches and a pulse mode switch. Depending on the sequence in which these switches are actuated, the microprocessor controls the drive motor in a manual continuous mode at any one of $N \times M$ speeds, a manual pulse mode at any one of $N \times M$ speeds or an autopulse mode with any one of three patterns of energization. In the first pattern of energization the motor is energized to run at one of M constant speeds during intervals T1 which are separated by intervals T2 during which the motor is not energized. In a second pattern of energization the motor starts at one of M speeds, the energization being gradually decreased over each interval T1 so that the motor speed decreases. In a third pattern of energization, the motor is initially energized to run at one of M speeds with the energization increasing over each interval T1. Any mode may be programmed for one of M run intervals. All modes and patterns of motor energization are controlled by only $M+N+1$ switches (excluding ON/OFF switches) and the sequence in which the switches are actuated.

19 Claims, 12 Drawing Sheets

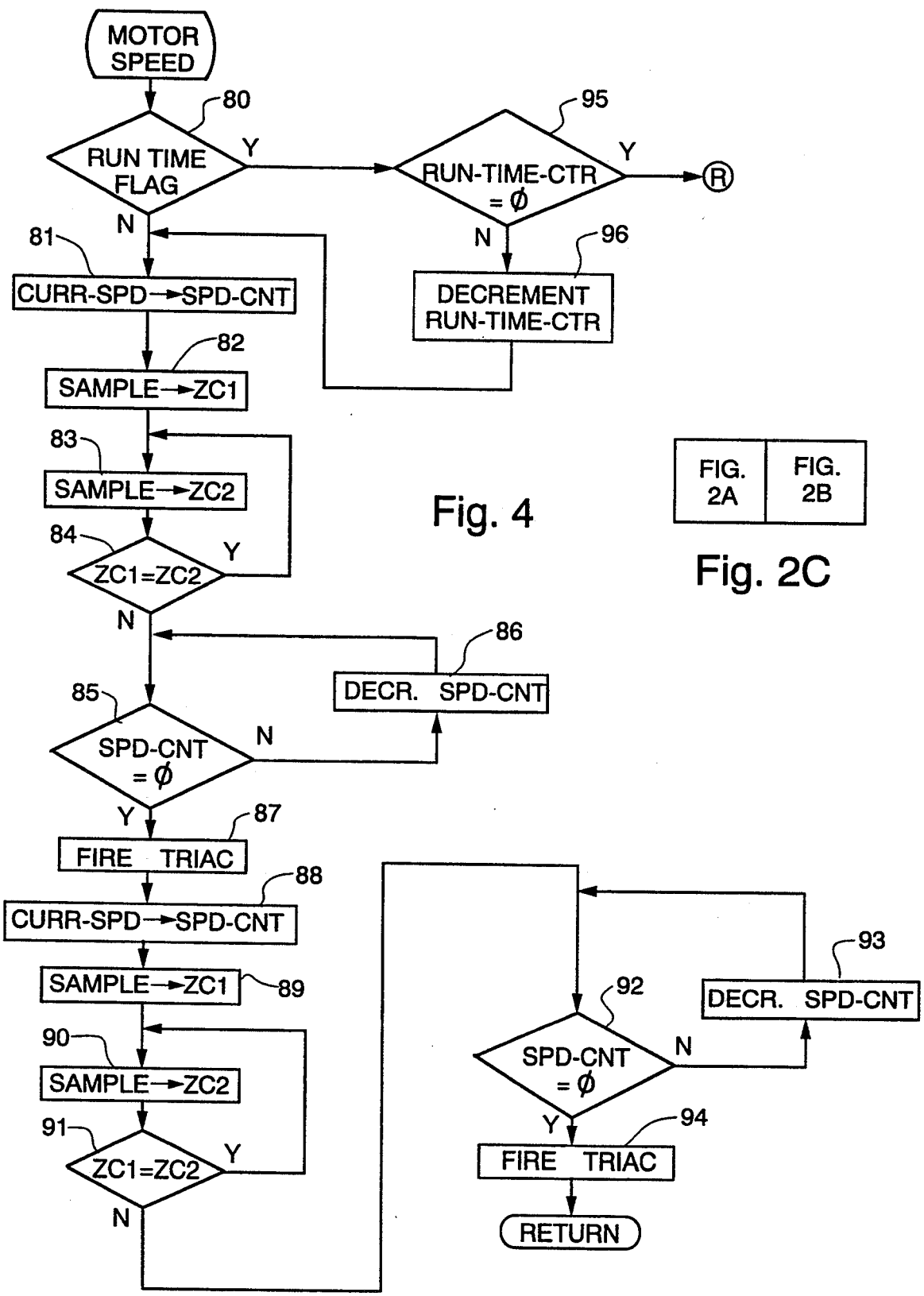

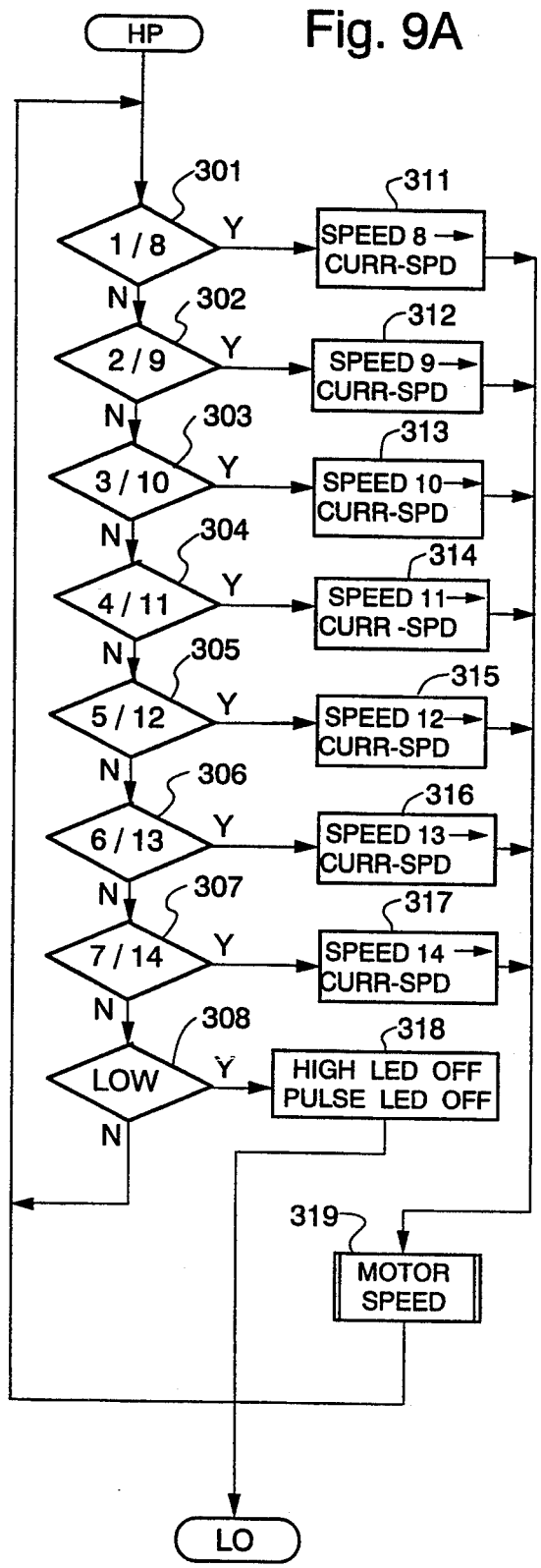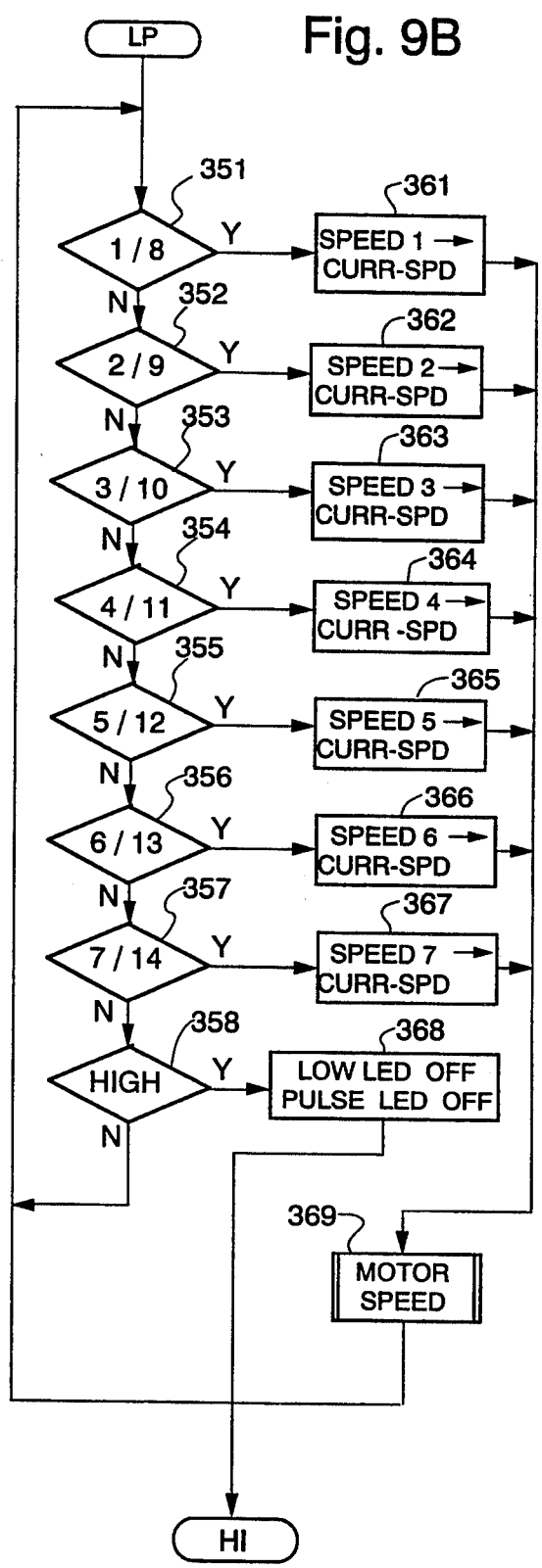

SPEED AND MODE CONTROL FOR A BLENDER

FIELD OF THE INVENTION

The present invention relates to a household blender or the like for blending, mixing, chopping, liquefying, aerating, etc. liquids and solids, and more particularly to a microprocessor-based control circuit for controlling energization of the blender drive motor. The control circuit requires fewer manual selection switches than prior art devices yet it permits more modes of operation and patterns of drive motor energization than prior devices.

BACKGROUND OF THE INVENTION

It has been conventional to provide household blenders with an operator's panel with switches whereby a user may select one of a plurality, usually 14, drive motor speeds and further select a mode of energization of the motor. Swanke et al. U.S. Pat. No. 3,678,288 discloses such a blender having 7 speed selection push buttons. The push-buttons drive slider elements which close switches so as to selectively energize various combinations of fields in a drive motor having multiple fields. Field selection provides seven speeds in a high range. Seven speeds in a low range are obtained by applying only half cycles of the AC energizing voltage to the motor when certain combinations of the switches are actuated. Once a speed selection push button is depressed, the motor is energized until an OFF switch is actuated. The device also has a jogger or pulse mode pushbutton which energizes the motor at one speed only as long as the pushbutton is depressed. Pulsing the motor on/off or at high and then low speeds permits the material being processed to fall back to the region of the cutting knives thereby improving the processing of the material.

Ernster et al. U.S. Pat. No. 3,951,351 discloses a blender having a rotary switch for selecting a high or low range of speeds and 5 pushbutton switches for selecting a speed within the selected range. The pushbutton switches connect various segments of the motor field winding in the energizing circuit. This device also includes a pulse mode pushbutton which causes energization of the motor only as long as the pushbutton is depressed. The motor may be energized in the pulse mode at any selected speed.

In Cockroft U.S. Pat. No. 3,548,280 a blender is provided with 10 speed selection switches. An SCR is connected in series with the motor and has a control electrode connected to resistances which are brought into the electrode circuit by actuation of the speed selection switches to control the angle of firing of the SCR and thus the speed of the motor. This device also has a mode selection switch for selecting the manual mode or a cycling or pulse mode in which the motor is alternately energized and deenergized over a plurality of cycles, the number of cycles being set by a potentiometer controlled by a rotatable knob. In a preferred embodiment the on and off intervals are set during manufacture but the patentee suggests that two potentiometers may be provided to enable an operator to vary the on and off times.

Oota et al. U.S. Pat. No. 4,459,524 discloses a food processor having a microcomputer for controlling the firing of a bi-directional thyristor which is connected in series with the drive motor. Manual switches are provided for setting the interval of energization of the motor. However, this device operates at a single motor speed and lacks a pulse mode control Stottmann U.S. Pat. No. 4,822,172 discloses a microprocessor-based food mixer having UP and DOWN switches for selecting one of 10 drive motor speeds. The switches control the increase/decrease of motor speed during the intervals they are pressed. The device may be operated in a normal mode in which, once a speed is selected, the motor is energized until a stop switch is actuated or the mode is changed. The device may also operate in a timed mode in which the motor is energized for an interval of time, the interval being set by successive actuations of a mix timer switch.

The prior art devices have several disadvantages in that they require motors having special field windings or field winding taps, mechanical push-button switch mechanisms which wear, or which require a long time, relatively speaking, to select the motor speed. None of the devices provide continuous, manual pulse and auto-pulse modes of operation, nor do they provide an auto-pulse mode of operation wherein both on/off times and speed modification during on time may be selected by the operator.

SUMMARY OF THE INVENTION

An object of the present invention is to provide a microprocessor-based blender or the like which requires no special motor and may be set to operate at any one of a plurality of speeds in a continuous, pulsed or autopulsed mode, either timed or untimed, by actuation of three or four switches depending on the selected mode and whether the blender is initially on or off.

Another object of the invention is to provide a blender having speed selection switches, a zero-crossing detector for detecting zero crossings of an AC voltage, a drive motor and a gate connected in series across the AC voltage, and a microprocessor having first means responding to actuation of a speed selection switch for selecting a delay interval value, second means for sensing an output signal from the detector and, in response thereto, initiating the tolling of the delay interval represented by the delay value, and third means for turning on the gate to energize the drive motor when the delay interval has elapsed.

A further object of the invention is to provide a blender having a drive motor, selection switches and means responsive to actuation of the switches for controlling the pattern of energization of the motor over cycles each having an on and an off interval, energization of the motor being variable during each on interval. The motor may be energized to run at a constant, steadily decreasing, or steadily increasing speed.

In accordance with a preferred embodiment of the invention, the blender motor is connected in series with a triac and the angle of firing of the triac is controlled by a microprocessor to thereby control the motor speed. A zero-crossing detector senses zero-crossings of the AC voltage which drives the motor and provides an output signal at each crossing. A control panel includes seven speed selection switches, a high and a low speed range selection switch and a pulse mode switch. The microprocessor senses these switches and the output of the zero-crossing detector and outputs a signal to the triac to control its angle of firing. The sequence in which the switches are actuated determines the program sequence of the microprocessor. The speed selection switches perform multiple functions of drive motor speed selection, selection of interval of drive motor energization, and selection of the duration of the on/off times or high/low speed intervals in an autopulse mode, the function resulting from actuation of a speed selection switch being dependent on which switch or switches are actuated immediately prior to actuation of the speed selection switch.

Other objects of the invention and its mode of operation will become apparent upon consideration of the following description and the accompanying drawings.

BRIEF DESCRIPTION OF THE DRAWINGS

FIG. 4 illustrates a Motor Speed subroutine;

FIGS. 9A and 9B illustrate the High Pulse and Low Pulse routines, respectively;

DETAILED DESCRIPTION OF THE INVENTION

Figure 1:
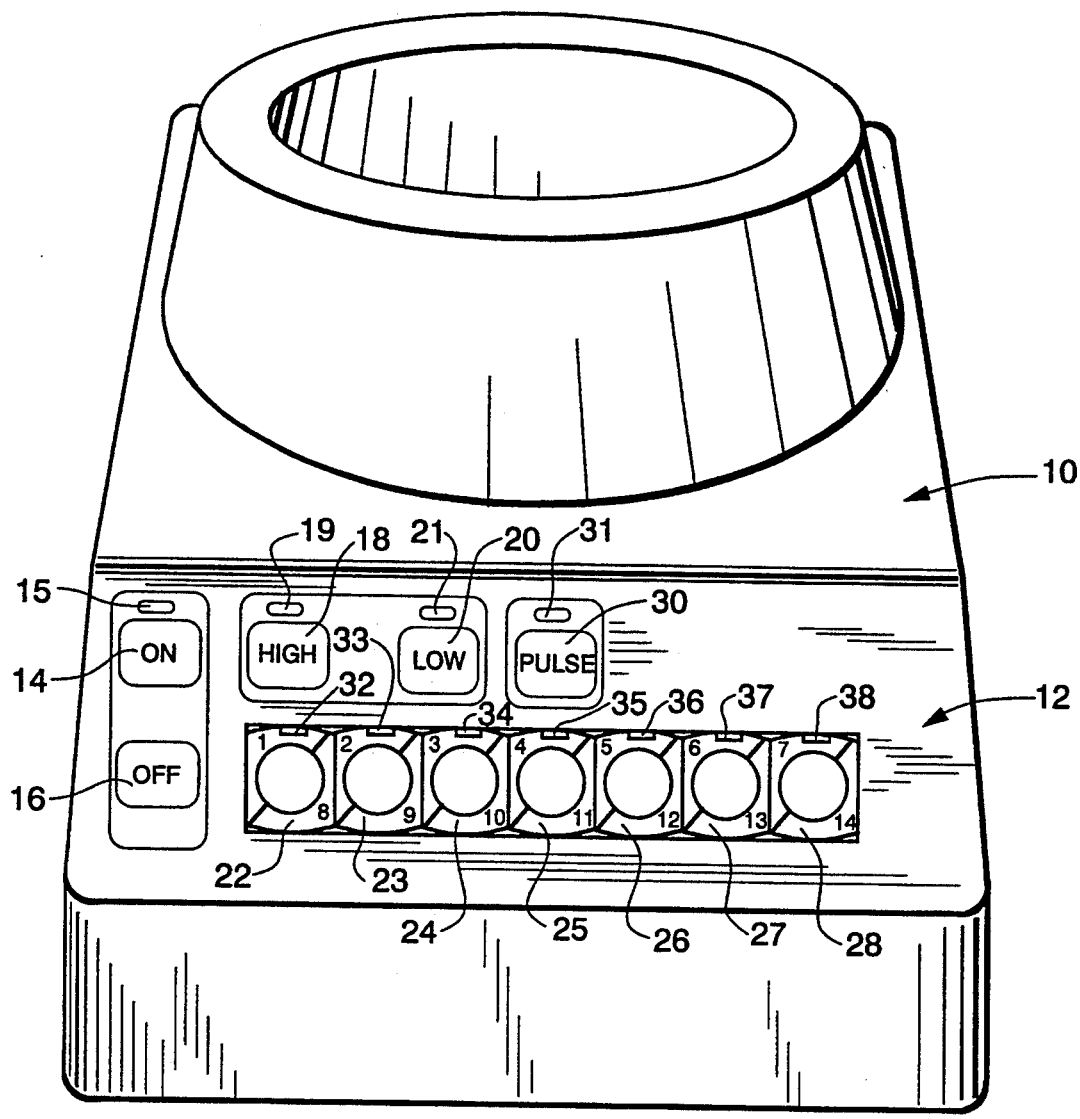
FIG. 1 is a perspective view of the base unit of a blender having a control panel with programming switches thereon.
Figure 2A:
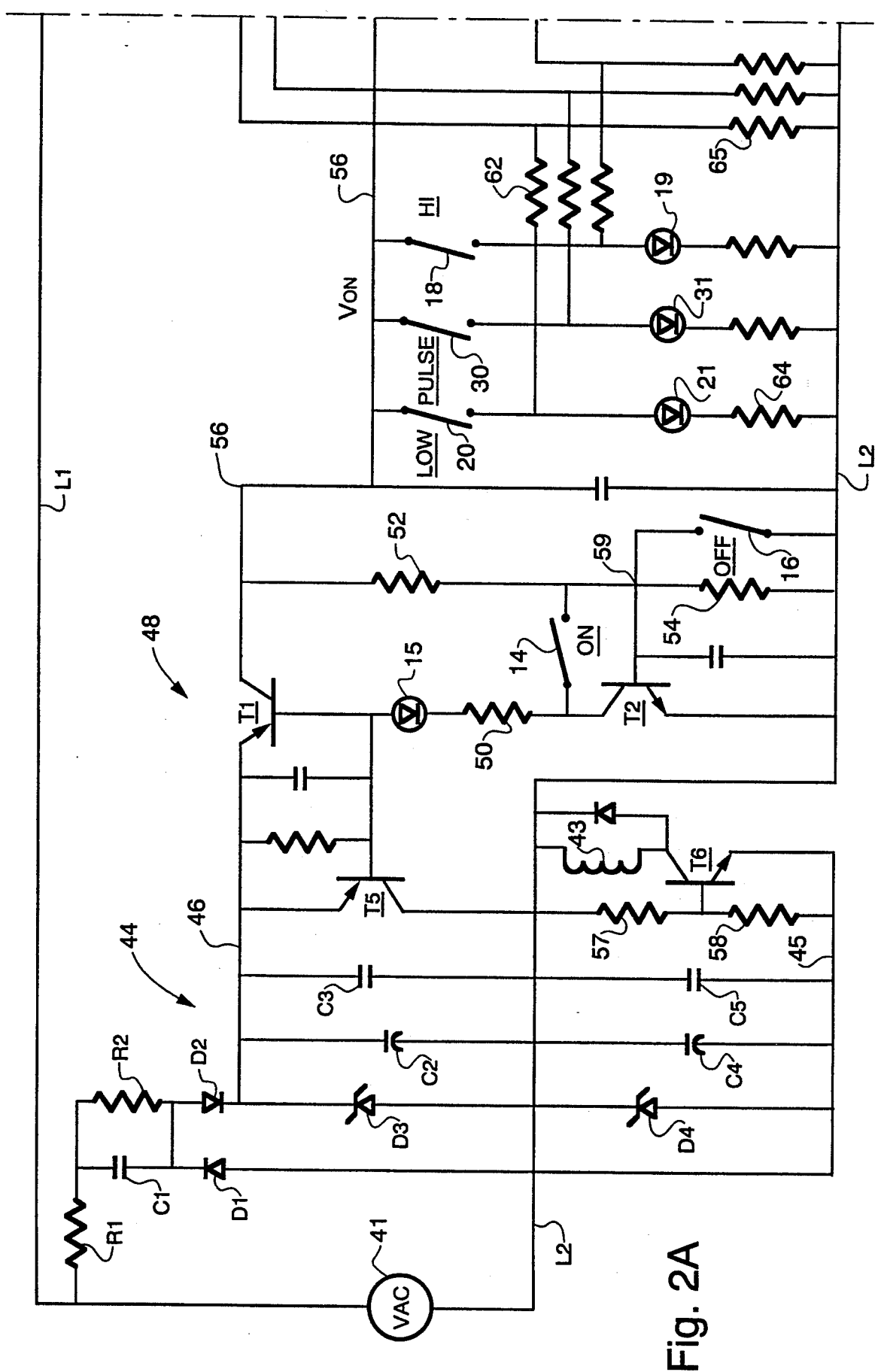
FIGS. 2A and 2B, when arranged as shown in FIG. 2C, comprise a schematic diagram of a control circuit for a blender drive motor.
Figure 2B:
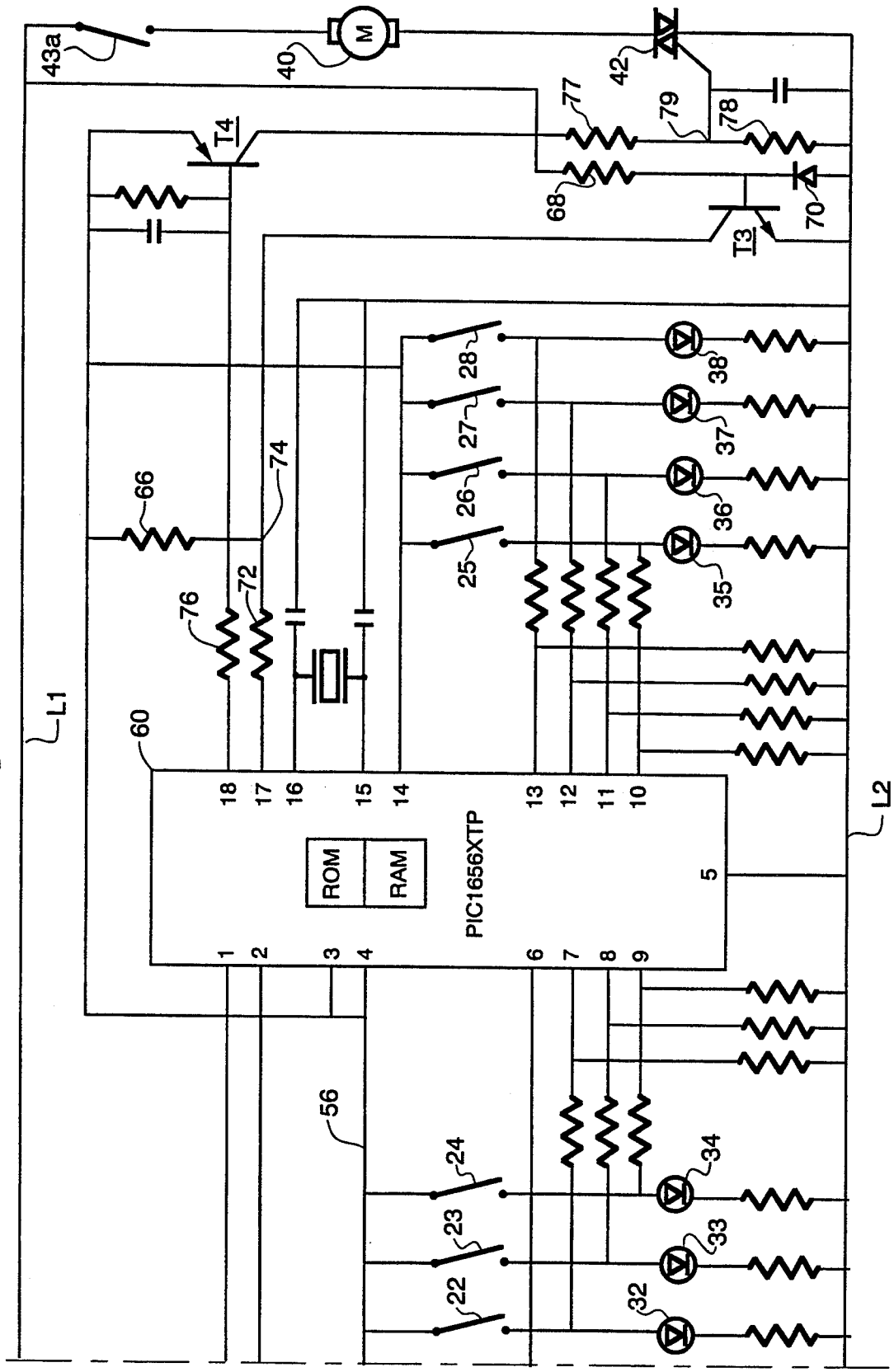

FIG. 1 shows the base portion of a blender 10 having a control panel 12 by means of which an operator may program operation of a blender drive motor 40 (FIG. 2B). The blender 10 is of conventional design in that the drive motor drives a vertically extending shaft that rotates blades located within a container which rests on the base portion. While the invention is described herein as applicable to household blenders, the principles of the invention are equally applicable to both household and commercial blenders, stirrers, mixers, dicers, liquefiers, aerators or the like.

The illustrated embodiment is a 14-speed blender having an ON switch 14 with an associated LED indicator 15 and an OFF switch 16. The ON and OFF switches control application of power to the drive motor and a logic control circuit as subsequently described. The LED 15 is illuminated after the ON switch has been actuated.

The control panel also includes N=2 speed range selection switches. These include a HIGH switch 18 with an associated LED 19 and a LOW switch 20 with an associated LED 21. The HIGH and LOW switches are actuated to select either a high or a low range of drive motor speeds. M=7 motor speed selection switches 22, 23, 24, 25, 26, 27 and 28 are provided for selecting one of seven speeds within the range selected by the HIGH and LOW switches. Switch 22 in combination with the Low switch selects motor speed 1 whereas switch 22 in combination with the High switch selects speed 8. Therefore switch 22 is referred to as the ⅛ speed selection switch. Switches 23 . . . . 28 are similarly referred to as the 2/9 . . . . 7/14 speed selection switches. Seven LEDs 32, 33, 34, 35, 36, 37 and 38 are associated with the seven speed selection switches to provide the operator with a visual indication of which speed selection switch is active.

A PULSE mode switch 30 having an associated LED 31 is provided for selecting the pulse mode of operation. When this switch is inactive the control circuit drives the motor 40 in a continuous mode and when it is active the motor is driven in a jogger or pulse mode.

As subsequently explained, energization of the drive motor 40 depends not only on which of the control panel switches are operated but also the sequence in which they are operated. For example, the speed selection switches are utilized for selecting both a drive motor speed and a run time as explained hereinafter.

The control panel switches may be membrane or tactile switches having switch contacts which are closed only while the membrane is depressed in the area of the switch. The switch contacts are shown in FIGS. 2A and 2B where they bear reference numerals corresponding to the switches of FIG. 1.

FIGS. 2A and 2B comprise a schematic block diagram of the control circuit for controlling energization of drive motor 40 in response to actuation of the various switches on the control panel 12. The drive motor 40 is connected in series with a triac 42 and normally open contacts 43a across two leads L1 and L2. Normally open contacts 43a are operated by a relay 43 (FIG. 2A). The leads L1 and L2 are connected via an appliance cord and plug to a suitable voltage source 41 such as 120V AC. Lead L2 is connected to the grounded side of the voltage source.

In FIG. 2A, resistors R1 and R2, capacitors C1-C5, diodes D1 and D2 and Zener diodes D3 and D4 comprise a logic voltage power supply circuit 44 for producing regulated DC voltages. When leads L1 and L2 are connected to the AC voltage source 41 the power supply circuit 44 applies a voltage of about 5.6V (limited by Zener diode D3) between leads L2 and 46 to an ON/OFF control circuit 48. A voltage of about 15V (limited by Zener diode D4) is produced between leads L2 and 45 to power the relay 43.

The ON/OFF control circuit 48 comprises four transistors T1, T2, T5 and T6, the relay 43, the ON switch contacts 14 and the OFF switch contacts 16. The emitters of transistors T1 and T5 connected to lead 46 while the emitters of transistors T2 and T6 are connected to leads L2 and 45, respectively. The bases of transistors T1 and T5 are tied together and connected through the ON LED 15 and a resistor 50 to the collector of transistor T2 and one side of ON switch 14. The base of transistor T2 is connected through a resistor 52 to the collector of transistor T1 and through a resistor 54 to lead L2. The contacts of ON switch 14 are connected between the base and collector of transistor T2 and the contacts of the OFF switch 16 are connected between the base of transistor T2 and lead L2. The base of transistor T6 is connected through a resistor 57 to the collector of transistor T5 and through a further resistor 58 to the lead 45. The coil of relay 43 is connected between the collector of transistor T6 and lead L2.

Assuming that leads L1 and L2 are connected to the AC voltage source 41 so that DC voltages are present between L2 and the leads 45 and 46, the ON/OFF control circuit 48 functions as follows. When the ON switch 14 is momentarily closed, a circuit is established from lead L2 through resistor 54, switch contacts 14, resistor 50 and ON LED 15 to the bases of transistors T1 and T5. This turns on transistors T1 and T5, lights the ON LED 15, and applies a logic level voltage $V_{ON}$ to lead 56 to power controller 60 and associated logic circuits. At the same time, the voltage of a junction point 59 rises thereby turning on transistor T2. A second circuit is thus established from lead L2 through transistor T2, resistor 50 and LED 15 to the bases of transistors T1 and T5. Since transistor T1 is now conducting, the voltage at junction point 59 holds transistor T2 "on" even after the ON switch is released and contacts 14 open.

When transistor T5 turns on, the voltage at the base of transistor T6 rises to turn transistor T6 on, thereby energizing the coil of relay 43.

Transistors T1, T2, T5 and T6 remain on and relay 43 remains energized as long as transistor T2 is on. In addition the ON LED 15 remains energized to signal the operator that the blender is "on" and the logic voltage $V_{ON}$ is available between leads L2 and 56 to power the logic circuits. With the relay energized, the relay contacts 43a (FIG. 2B) are closed. Closure of relay contacts 43a completes the circuit so that the series circuit comprising drive motor 40 and triac 42 is connected across the AC voltage present on leads L1 and L2. However, motor 40 is not energized at this time because triac 42 is not conducting.

The logic voltage $V_{ON}$ on lead 56 is terminated, relay contacts 43a are opened, and the ON LED 15 is extinguished by momentarily closing the OFF switch 16 thereby connecting the base of transistor T2 to lead L2. Transistor T2 stops conducting thus breaking the circuit from L2 through transistor T2 to transistors T1 and T5. Since no other conduction path exists between L2 and the transistor bases, the transistors stop conducting. With transistor T1 off, the logic voltage on lead 56 is terminated. When transistor T5 stops conducting, the transistor T6 is turned off thereby deenergizing relay 43. Relay contacts 43a open thus breaking the motor energization circuit. Since the circuit through the ON LED 15 is open, the LED is extinguished to signal the user that the blender is "off".

When the circuit is "on" the voltage $V_{ON}$ on lead 56 is applied to one side of each of the switches 18, 20, 22–28 and 30. The other side of each switch is connected through a resistor to a respective pin of a controller 60 and to lead L2 through the LED associated with the switch and a further resistor. The pin is connected through a pull-down resistor to lead L2. For example, the LOW switch 20 is connected through a resistor 62 to pin 1 of the controller, and through LED 21 and a resistor 64 to lead L2 with pin 1 being connected through a resistor 65 to lead L2.

The voltage $V_{ON}$ is also applied to pins 3, 4 and 14 of controller 60 and through a resistor 66 to the collector of a transistor T3. The emitter of transistor T3 is connected to lead L2. The base is connected through a resistor 68 to lead L1 and through a diode 70 to lead L2. Transistor T3 serves as a zero-crossing detector for detecting when the AC voltage crosses zero. The transistor is on as long as the voltage on lead L1 is effectively greater than zero (actually about 0.7V). However, when the voltage on lead L1 reaches zero the transistor switches off and remains off while the voltage on lead L1 is zero or negative. While the voltage on lead L1 is negative, diode 70 conducts thus protecting transistor T3.

Pin 17 of controller 60 is connected through a resistor 72 to a junction 74 between resistor 66 and the collector of transistor T3. Therefore, a low level or logic 0 voltage is applied to pin 17 while the transistor is on and when the voltage on lead L1 crosses zero to turn the transistor off, a high level or logic 1 voltage is applied to pin 17.

The controller 60 is preferably a microcomputer based. integrated circuit such as the type PIC 16C56-XTP manufactured by Microchip. It will be understood that the controller includes a microprocessor, conventional ROM and RAM storage, and data processing and interface circuits. The ROM stores a program which controls the sampling of the states of the switches and zero-crossing detector T3 connected to pins 1, 2, 6–13 and 17 and, depending on which switch or switches is/are active, produces an output signal at pin 18. This pin is connected through a resistor 76 to the base of a transistor T4 the purpose of which is to control the firing of triac 42. The collector of transistor T4 is connected through two resistors 77 and 78 to lead L2 and the junction 79 between the resistors is connected to the gate of triac 42. The emitter of transistor T4 is connected to $V_{ON}$. When the signal at pin 18 goes low, it turns on transistor T4 so that the voltage at junction 79 rises. This turns on triac 42 so that drive motor 40 is energized by the AC voltage between leads L1 and L2. The triac continues to conduct until the AC voltage crosses zero.

Figure 3:
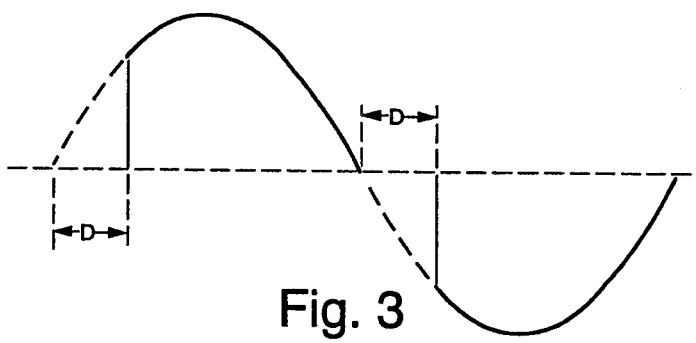
FIG. 3 is a waveform diagram illustrating energization of a blender drive motor over one AC cycle.

As illustrated in FIG. 3, the speed of drive motor 40 is controlled by controlling the time at which triac 42 fires during each half cycle of the AC wave across leads L1 and L2. The ROM in controller 60 stores digital values, each value representing a delay interval D. As subsequently explained, when one of the speed selection switches ⅛–7/14 is actuated, the microprocessor accesses the ROM and saves the accessed digital value at a RAM location CURR_SPD. Later, when a Motor Speed subroutine is executed to energize motor 40, the value in CURR_SPD is used to delay the time of firing of the triac 42 for the interval D after each zero crossing of the AC wave, thereby controlling the motor speed.

FIG. 4 illustrates the Motor Speed subroutine. This subroutine is executed once during each cycle of the AC voltage across leads L1 and L2 during intervals when the motor 40 is to be energized. When the subroutine is called as subsequently described, the microprocessor first executes step 80 to test a Run Time Flag. Assuming for the moment that this flag has not been set, step 81 transfers the delay interval value in location CURR_SPD to a location SPD_CNT. At steps 82 and 83, the voltage at controller pin 17 is tested to see if it is a logic 1 or a logic 0 and the logic values resulting from the tests are saved at memory locations ZC1 and ZC2. At step 84, ZC1 and ZC2 are compared and if they are equal (either both 0 or both 1) it means that the AC voltage has not made a zero crossing so as to change the conduction state of the transistor T3. The program loops back from step 84 to step 83 to again sample the voltage at pin 17. Steps 83 and 84 are repeated until a zero crossing occurs. At this time the next execution of step 83 causes location ZC2 to be loaded with a value different from that in ZC1. The next execution of step 84 then shows that the values in ZC1 and ZC2 are not equal so the program advances to step 85.

Steps 85 and 86 are repeatedly executed to toll the delay interval D (FIG. 3). The digital value in location SPD_CNT is tested at step 85 and if it is not zero the value in SPD_CNT is decremented at step 86. When the test at step 85 indicates that SPD_CNT has been decremented to zero, the program advances to step 87 where the microprocessor sends a low level logic signal via pin 18 to transistor T4 so that the triac 42 begins to conduct. The resulting current flow through the triac energizes the motor 42 and continues energizing the motor until the AC wave again crosses zero to turn the triac off.

Meanwhile, the microprocessor executes steps 88–91 to again transfer the contents of CURR_SPD to SPD_CNT and repeatedly sample the voltage at pin 17, looking for another zero crossing of the AC wave. When an execution of step 91 determines that a second zero crossing has occurred (ZC1 is not equal to ZC2) the program advances to step 92 to begin tolling the delay interval D for the second half of the AC cycle. The value in location SPD_CNT is repeatedly tested for a zero value at step 92 and decremented at step 93 until the test at step 92 shows that SPD_CNT has been decremented to zero. At this time the microprocessor applies another low level logic signal to transistor T4 via pin 18 to again turn the triac 42 on and energize the motor 40. The triac remains on until the next zero crossing of the AC voltage. Meanwhile, a return is made from the Motor Speed subroutine to the routine which called it.

It will be appreciated that since one pass through the Motor Speed subroutine controls energization of the motor 40 during only one cycle of the AC voltage, the subroutine is called many times depending on the interval over which the motor is to be energized. As subsequently explained, the interval of energization may vary depending on the mode of operation selected by the operator.

Figure 5:
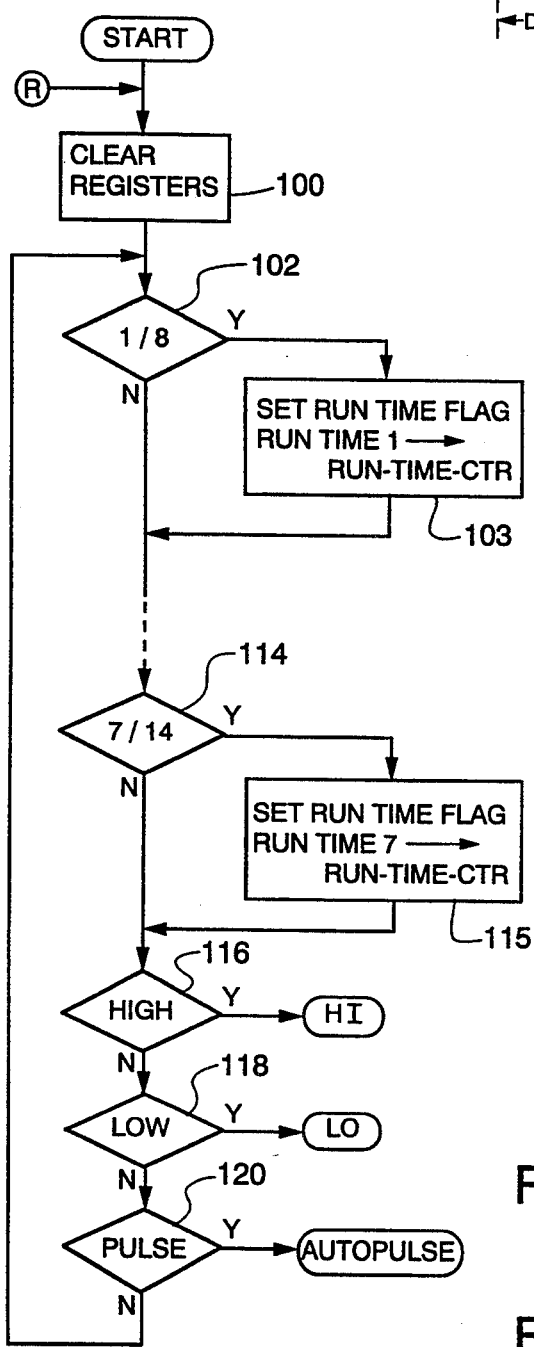
FIG. 5 illustrates a Start routine.

When the ON switch 14 is actuated to apply $V_{ON}$ to the controller 60, it begins execution of a program stored in its ROM. FIG. 5 shows the START routine which is always the first routine executed after $V_{ON}$ is applied. The routine begins at step 100 which resets all registers within the controller. The routine then sequentially samples the voltages present at controller pins 7–13, 1–2 and 6 to see if a high logic level voltage is present indicating that the switch connected to a pin is actuated. The ⅛ speed selection switch is tested at step 102. Assuming that the ⅛ switch is not actuated, the routine then tests the 2/9 through 7/14 switches. FIG. 5 does not show the steps for testing the 2/9 ... 6/13 switches since they are similar to the tests made at steps 102 and 114.

Assuming that none of the speed selection switches are actuated, the program then tests the High switch 18 at step 116, the Low switch 20 at step 118 and the Pulse switch 30 at step 120. If none of these switches are actuated the program loops back to step 102 to again test each of the switches. This continues until one of the switches tested is found to be actuated, or until the OFF switch 16 is actuated to remove Dower from the control circuit and drive motor.

Since the sequencing of controller 60 is dependent on which switches are operated, and the sequence in which they are operated, the program will be described below in separate sections for the different possible modes of operation.

Manual Speed Selection-Continuous Mode

Figure 6A:
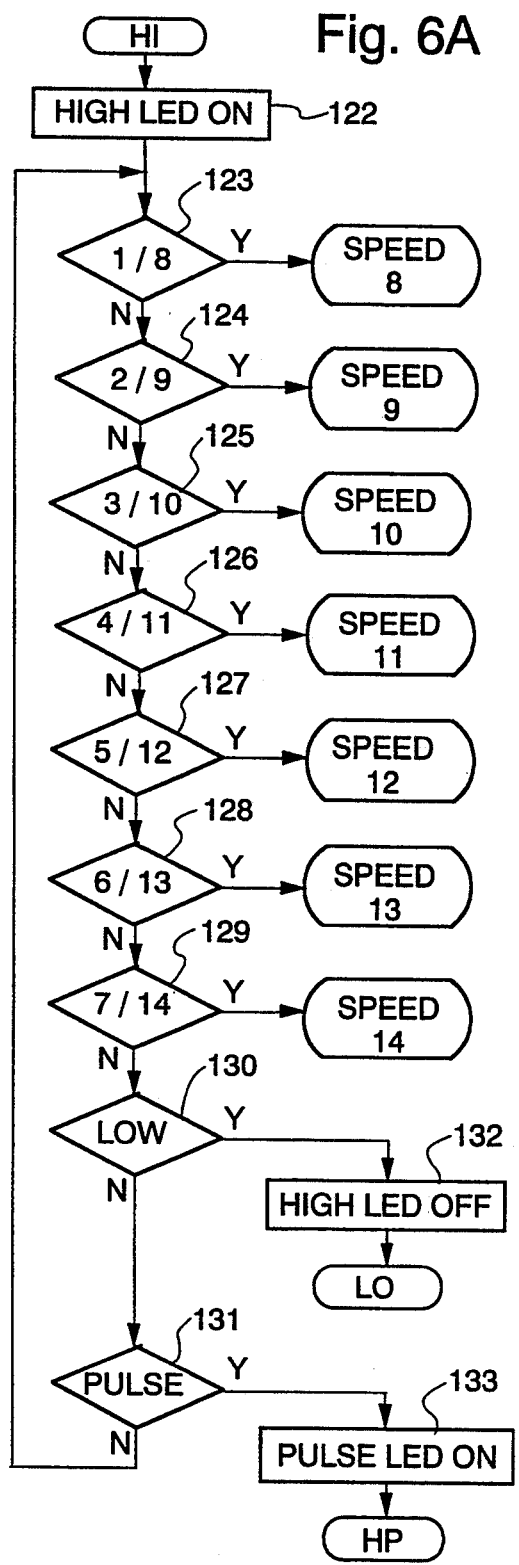
FIGS. 6A and 6B illustrate the HI and LO routines, respectively.

In this mode of operation, the blender drive motor 40 is energized from the time the operator actuates one of the speed selection switches until the OFF switch 16 is actuated. Assuming that the control circuit is in the off condition, this mode requires the following sequence of switch actuations:
ON
HIGH or LOW
⅛ to 7/14
OFF When the ON switch 14 is actuated, the program begins execution of the subroutine of FIG. 5, repeatedly testing the switches ⅛–7/14, HIGH, LOW and PULSE. Next, the operator selects the high or low speed range. Assuming that the operator actuates the HIGH switch 18, the switch condition is detected by controller 60 when, at step 116 (FIG. 5) it detects a high logic 1) voltage level at pin 6. The program branches from step 116 to the HI routine of FIG. 6A where, at step 122, it begins applying an output signal to pin 6 so that the HIGH LED 19 remains lit even after the operator removes his/her finger from the HIGH switch.

Figure 7A:
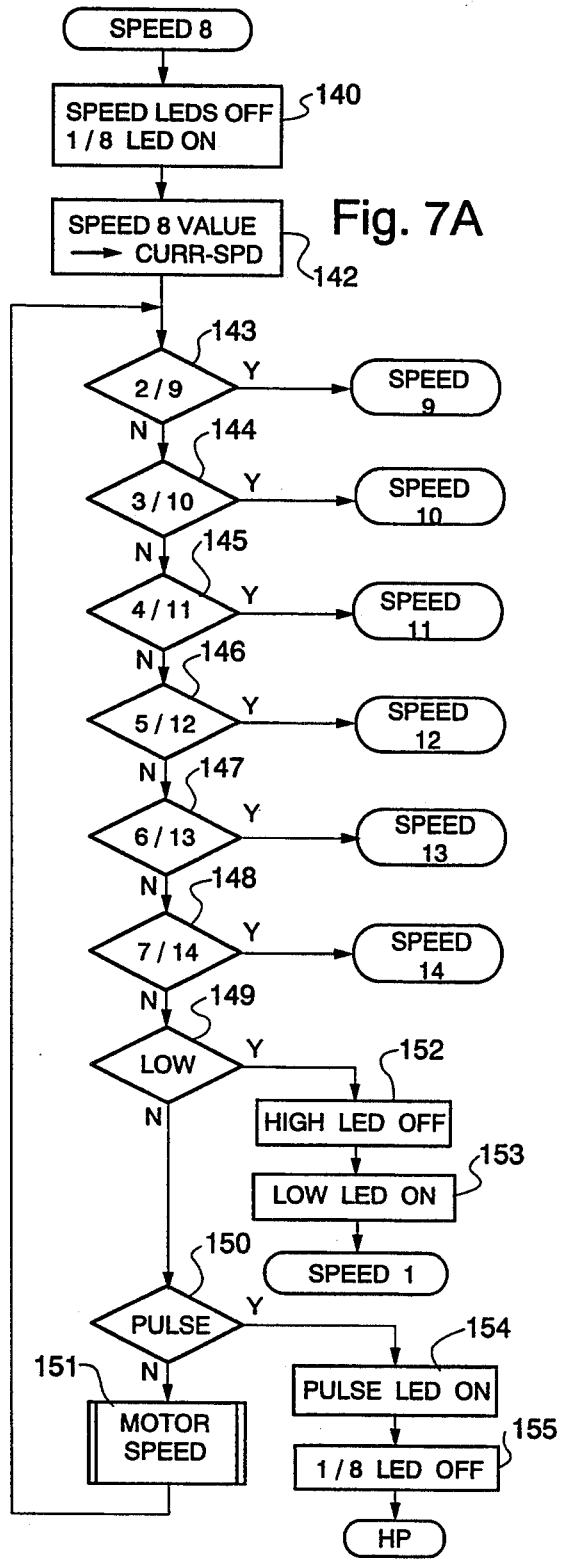
FIGS. 7A and 7B illustrate the Speed 8 and Speed 14 routines, respectively.
Figure 7B:
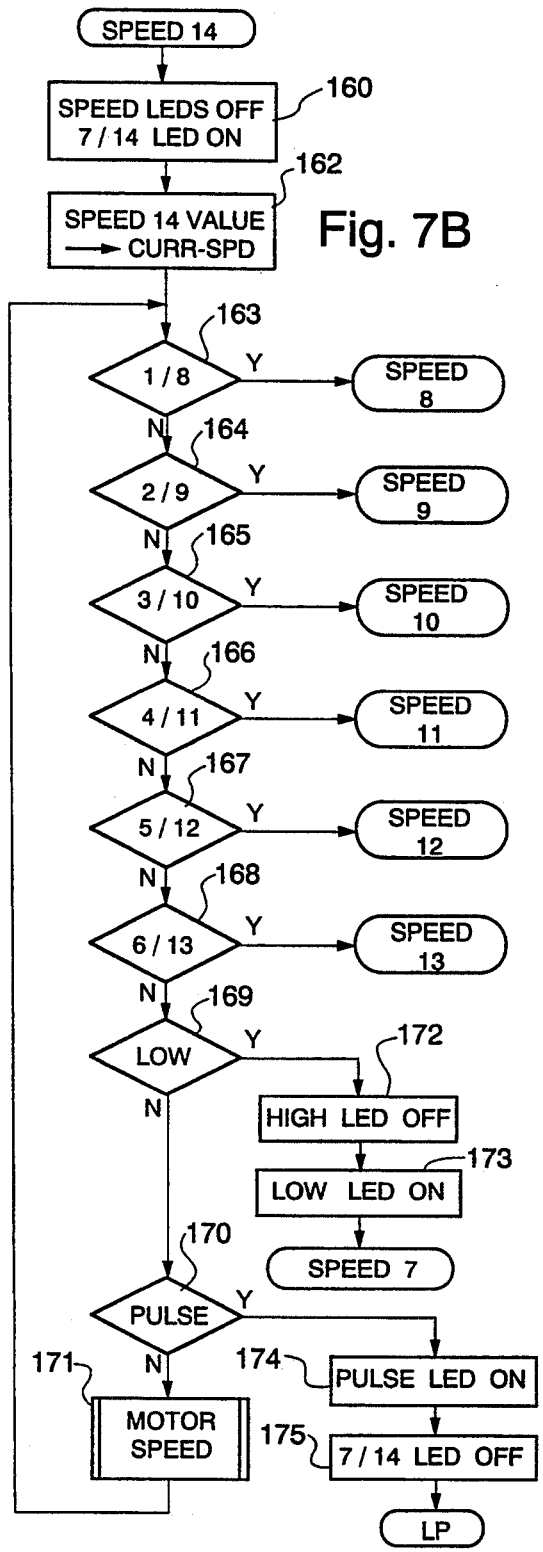

After the HIGH LED is turned on, the controller repeatedly executes a loop comprising steps 123–131. During each execution of the loop the controller tests the ⅛–7/14, LOW and PULSE switches to see if one of the switches is actuated. Normally, the operator will actuate one of the speed selection switches ⅛ to 7/14. Depending on which of the seven speed selection switches is actuated, the program will branch to one of seven high speed routines designated Speed 8 to Speed 14. The Speed 8 and Speed 14 routines are illustrated in FIGS. 7A and 7B, respectively. The Speed 9-Speed 13 routines are quite similar to the routines shown.

Assume that the operator selects Speed 8, the lowest speed in the high range, by actuating the ⅛ switch 22. The next time the program reaches step 123 it detects actuation of the switch and branches to the Speed 8 routine illustrated in FIG. 7A.

At step 140, all speed LEDs are turned off and the ⅛ LED 32 is turned on to indicate that the ⅛ switch is active. At step 142 a value representing speed 8 is moved from ROM to location CURR_SPD in RAM. After the speed 8 value is retrievers, the program tests the 2/9–7/14, LOW and PULSE switches at steps 143–150 to see if the operator has actuated any switch other than the ⅛ and HIGH switches. Assuming there have been no changes in the switch settings, the Motor Speed subroutine (FIG. 4) is called at step 151.

The Motor Speed subroutine executes steps 80–94 as previously described to control the firing of triac 42 and energization of motor 40 for one cycle of the AC voltage on leads L1 and L2. The speed 8 value entered in CURR_SPD at step 142 transferred to SPD_CNT at steps 81 and 86 and is the speed count value used at steps 85–86 and 92–93 to control the angle of firing of the triac.

After one execution of the Motor Speed subroutine the program returns to step 143 to again test the 2/9 to 7/14, LOW and PULSE switches to see if the operator has actuated any of these switches to change the speed or mode of operation. Assuming no switch actuation, the Motor Speed subroutine is again called to control the firing of triac 42 for another cycle of the AC voltage. The loop comprising steps 143–151 is thus repeatedly executed until the operator actuates some switch.

Assuming the operator is satisfied with the selected speed, energization of the motor 40 is permitted to continue until the condition of the material being blended satisfies the operator. Since the ⅛ speed selection switch is not tested during the Speed 8 routine, motor energization continues even after the operator releases one ⅛ switch. The operator must actuate the OFF switch to terminate motor energization. Actuation of the OFF switch terminates the voltage powering the motor 40 and controller 60 and program execution terminates.

The operator may change the selected motor speed from Speed 8 to some other speed while the program loop comprising steps 143–151 (FIG. 7A) is being executed. The newly selected speed may be in either the high or the low speed range. Assume the operator selects speed 14 by actuating the 7/14 switch. On the first execution of step 148 following actuation of the switch, the program branches to the Speed 14 routine illustrated in FIG. 7B. All speed LEDs are turned off and the 7/14 LED is turned on at step 160. At step 162 the digital value for speed 14 is moved from ROM to CURR_SPD. At steps 163–170 the switches are tested to see if any switch other than the 7/14 switch has been actuated and if no switch has been actuated, the Motor Speed subroutine is called at step 171 to control triac 42 according to the value in CURR_SPD. From the foregoing description it is evident that any one of the Speed 8-Speed 14 routines may be entered directly from the HI routine of FIG. 6A or from any other of the Speed 8-Speed 14 routines.

The foregoing description assumed that the HIGH switch was actuated after the ON switch so that the high range of speeds 8–14 was selected. Assume now that the LOW switch is the first switch actuated after the ON switch. In FIG. 5, actuation of the LOW switch is detected at step 118 and the program branches to the LO routine shown in FIG. 6B. This routine is quite similar to the HI routine previously described and controls the selection of one of seven speeds in the low range. The primary difference is that the LOW LED is turned on at step 182. The routine then repeatedly executes the loop comprising steps 183–191 testing the ⅛-7/14, HIGH and PULSE switches to see if any switch is actuated.

At this point the operator may decide to select the high range of motor speeds or the manual pulse mode of operation. If the HIGH switch is actuated then at the next execution of step 190 the program branches to step 192 where the LOW LED is turned off. The program then moves to the HI routine (FIG. 6A) and proceeds as previously described. If the operator actuates the PULSE switch 30, the switch state is sensed at step 191. The PULSE LED 31 is turned on at step 193 before the program branches to the LP (Low Pulse) routine illustrated in FIG. 9B.

Figure 6B:
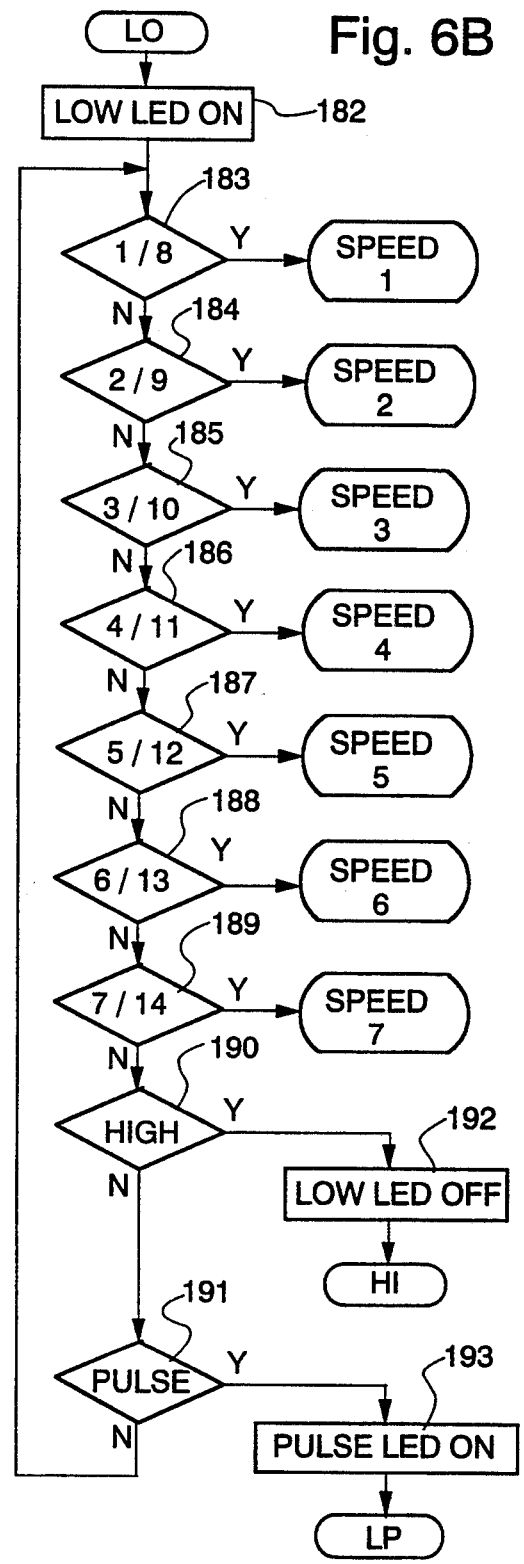
Figure 8A:
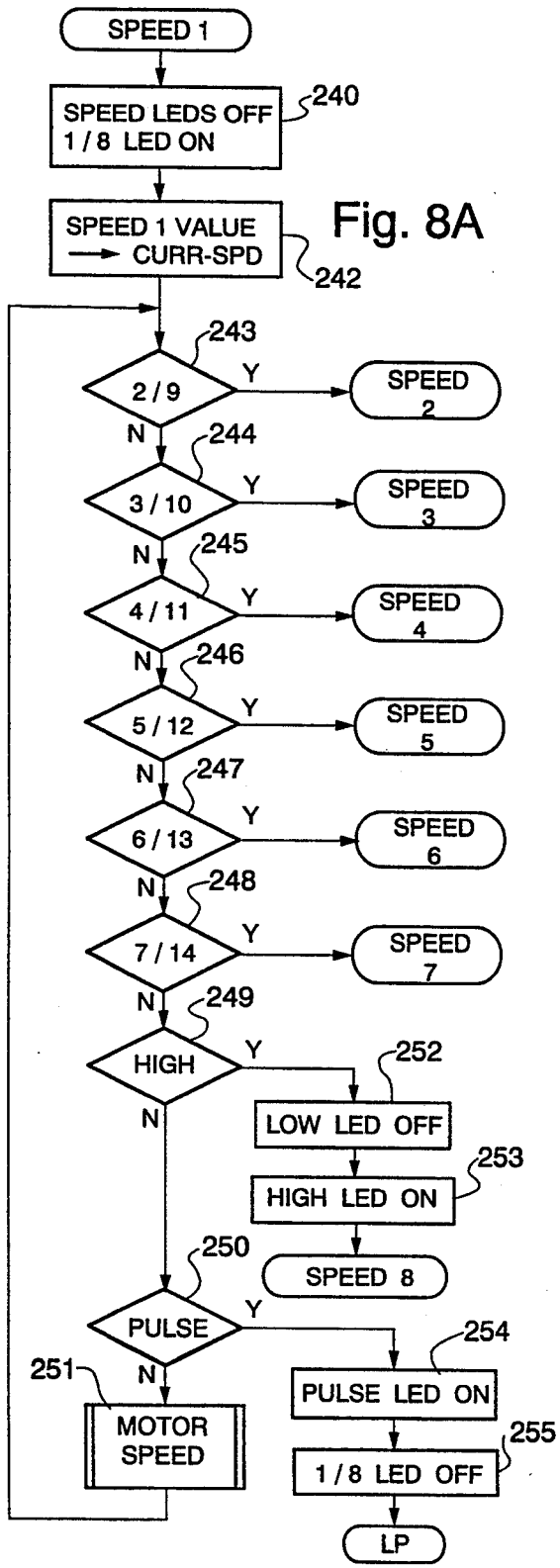
FIGS. 8A and 8B illustrate the Speed 1 and Speed 7 routines, respectively.
Figure 8B:
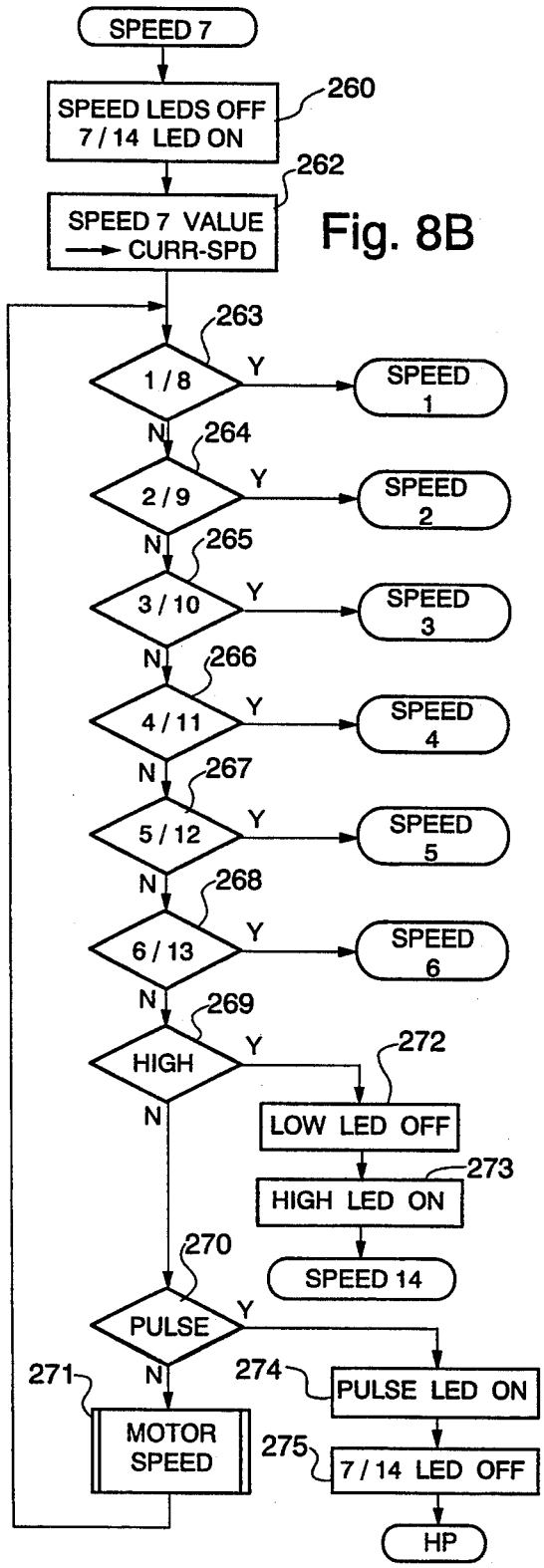

If the operator actuates one of the speed selection switches ⅛-7/14 while the program is executing the loop of FIG. 6B, the program detects the switch actuation at one of steps 183–89 and branches to one of seven low speed control routines Speed 1-Speed 7. Two of these routines, Speed 1 and Speed 7, are illustrated in FIGS. 8A and 8B, respectively. The Speed 2-Speed 6 routines are similar to the Speed 1 and Speed 7 routines and thus are not shown.

The Speed 1-Speed 7 routines control energization of motor 40 at one of the seven speeds in the low range in the same manner that the Speed 8-Speed 14 routines control energization of the motor at one of the seven speeds in the high range. Comparing the Speed 8 routine of FIG. 7A with the Speed 1 routine of FIG. 8A, it will be noted that different speed values are loaded into CURR_SPD at steps 142 and 242. Insofar as motor speed control is concerned, this is the only difference between the routines so the manner in which the routines of FIGS. 8A and 8B control motor speed is believed obvious from the foregoing description of FIG. 7A.

There are two further differences between the Speed 1-Speed 7 and Speed 8-Speed 14 routines. In the high speed routines, the status of the LOW switch is tested (see step 149 of FIG. 7A) to determine if the operator wishes to change to the low range of speeds whereas in the low speed routines the HIGH switch is tested (step 249) to determine if the operator wishes to change to the high range of speeds. If the test at step 249 shows that the HIGH switch is actuated, the LOW LED is turned at step 252 and the HIGH LED is turned on at step 253 before the routine exits to the Speed 8 routine.

From the foregoing description it is evident that there is considerable flexibility of control, thereby permitting an operator to change from one speed to another as conditions require, or if the operator has inadvertently selected the wrong speed. Speed changes within the high or low range are accomplished merely by actuating a speed selection switch. Changes between ranges require one and possibly two switch actuations. When the HIGH or LOW switch is actuated to change ranges, the motor is first driven at a speed having a rank (lowest, next to lowest, etc.,) in the new range which corresponds to the rank of the speed in the old range. If this isn't the desired speed in the new range then the operator must actuate the speed selection switch for the desired speed.

Manual Speed Selection-Pulse Mode

In this mode of operation the blender drive motor 40 is energized only for an interval or intervals during which the operator is actuating one of the speed selection switches ⅛-7/14. Assuming that the control circuit is in the off condition, this mode requires the following sequence of switch actuation.

ON
HIGH or LOW
PULSE
⅛-7/14

When the ON switch is actuated the microprocessor begins execution of the Start routine (FIG. 5) as previously described. When the operator actuates the HIGH switch 18 or the LOW switch 20, the program senses the switch actuation at step 116 or 118 and branches to the HI routine (FIG. 6A) or the LO routine (FIG. 6B) depending on which switch is actuated.

If the HIGH Switch was actuated, the HI routine repeatedly executes steps 123–131, testing for an actuated switch. If the LOW switch was actuated the LO routine repeatedly executes steps 183–191 for the same purpose. When the operator actuates the PULSE switch 30, the switch actuation is detected at step 131 or 191 depending on whether the program is executing the HI or the LO routine. If the detection occurs at step 131, the PULSE LED 31 is turned on at step 133 and an exit is made to the HP (High Pulse) routine shown in FIG. 9A. On the other hand, if the detection occurs at step 191, the PULSE LED is turned on at step 193 and an exit is made to the LP routine shown in FIG. 9B.

The HP and LP routines control the motor speed in the manual pulse mode. When the HP routine is entered it begins execution of a loop comprising steps 301-308. The routine tests the speed selection switches ⅛-7/14 and the LOW switch (by sensing the voltages at controller pins 7-13 and 1) to see if any of these are actuated. When the operator actuates one of the speed selection switches, the ROM is addressed to access a speed value which is saved at CURR_SPD. This takes place at step 311, 312, . . . . or 317 depending on whether speed selection switch ⅛, 2/9, . . . or 7/14, respectively, is actuated by the operator.

The program is now ready to control the energization of the motor 40 according to the value in CURR_SPD. The Motor Speed subroutine (FIG. 4) is called at step 319 to control energization of the motor for one cycle of the AC voltage as previously described. Upon the return from the Motor Speed subroutine the HP routine loops back to step 301.

As an example, assume that the program is executing the loop comprising steps 301-308, waiting for the operator to actuate a switch. If the 4/11 switch is then actuated, this actuation will be detected the next time step 304 is executed. The program moves to step 314 where the speed 11 value is read from ROM into CURR_SPD. The Motor Speed subroutine is then called at step 319 to control energization of the drive motor 40 for one AC cycle. Upon return from the Motor Speed subroutine the program loops back to step 301.

Under the assumed conditions, the program repeatedly executes steps 301-304, 314 and 319 as long as the operator depresses the 4/11 switch. Energization of the motor ceases when the operator releases the 4/11 switch. The program then repeatedly executes steps 301-308, looking for an actuated switch. The operator may again actuate the 4/11 switch to again energize the drive motor at the same speed.

The operator may also change to a different motor speed within the high pulse speed range by actuating a different speed selection switch so that a different speed value is read from ROM and loaded into CURR_SPD. However, to select a pulse mode motor speed in the low range, the LOW switch 20 must be actuated followed by actuation of the PULSE mode switch 30. Actuation of the LOW switch is detected at step 308. At step 318 the HIGH and PULSE LEDs are turned off. The program then jumps to the LO routine (FIG. 6B) previously described. When the operator actuates the PULSE switch, its actuation is detected at step 191 of FIG. 6B. The PULSE LED is turned on at step 193 and the program jumps to the LP routine shown in FIG. 9B. The operator may now actuate one of the speed selection switches ⅛-7/14 to energize drive motor 40 at one of the seven pulse speeds in the low range, the energization continuing only as long as the speed selection switch is actuated. The operation of the LP routine is believed obvious in view of the close similarity between the LP routine and the HP routine previously described.

Programmed Run Time

An operator may manually select a maximum interval during which the drive motor 40 is energized. When a run time has been programmed the motor will be energized in the continuous mode for the programmed interval provided the operator does not actuate the OFF switch 16. In the pulse mode, the motor is energized until the programmed interval expires or the operator releases the speed selection switch, whichever occurs first.

The run time is programmed by actuating the ON switch 14 so that the controller begins executing the Start routine of FIG. 5. Next, one of the speed selection switches ⅛-7/14 is actuated. Each of these switches represents a different run time. For example, the ⅛ switch may represent 7 seconds, the 2/9 switch 14 seconds, - - - and the 7/14 switch 49 seconds. However, it is not necessary that the shortest interval be 7 seconds nor is it necessary that the other intervals be multiples of the shortest interval.

Assume that the 7/14 switch is actuated. When step 114 of the Start program is next executed, the switch actuation is detected and the program moves to step 115 where a Run Time Flag is set to indicate that a run time has been programmed. Step 115 also loads a digital representation of 49 seconds into a location RUN_TIME_CTR. The program then moves to step 116 and repeatedly executes the loop including steps 102, . . . 114, 116,. 118 and 120.

The operator may now select a speed range by actuating the HIGH switch 18 or the LOW switch 20. This causes the program to jump from step 116 to the HI routine (FIG. 6A) or from step 118 to the LO routine (FIG. 6B). The operator then actuates one of the switches ⅛-7/14 to cause the program to jump from the HI or LO routine to one of the Speed 1-Speed 14 routines, typical ones of which are illustrated in FIGS. 7A, 7B, 8A and 8B. The steps of these routines are executed as described above. However, when the selected speed routine calls the Motor Speed subroutine, the subroutine is executed in a slightly different manner. In FIG. 4, when the test is made at step 80 it proves true since the Run Time Flag has been set. The program tests. RUN_TIME_CTR at step 95 to see if it is zero. If it is not, RUN_TIME_CTR is decremented at step 96. From step 96 the program moves to step 81, the Motor Speed subroutine is executed as previously described, and a return is made to the speed routine which called the subroutine. Location RUN_TIME_CTR is thus decremented once for each cycle of the motor energizing voltage.

The end of the selected run time is signalled when RUN_TIME_CTR is decremented to zero at step 96. The next time the Motor Speed subroutine is called, the test at step 95 proves true, and the program branches to step 100 of the Start routine FIG. 5). The registers and flags are cleared at step 100 and the program begins sampling the states of the switches to see if the operator has selected another action.

It should be noted that the run time loaded into RUN TIME_CTR represents the time of actual energization of the drive motor 40. Time is not tolled when the motor is not energized. For example, assume that the motor 40 is being operated in the pulse mode because either the HP or LP routine (FIGS. 9A, 9B) is being executed. As previously explained, the operator must have one of the speed selection switches ⅛-7/14 actuated. If the operator should release a speed selection switch, the Motor Speed subroutine is not called and RUN_TIME_CTR is not decremented. When the operator subsequently actuates a speed selection switch, either the one which was released or another one, decrementing of RUN_TIME_CTR is resumed because calling of the Motor Speed subroutine is resumed.

Autopulse Mode

The autopulse mode causes energization of the drive motor 40 to take place in a programmed pulse-like manner. Unlike the manual pulse mode, the pulsing takes place automatically and the operator is not required to repeatedly depress and release a speed selection switch. Typically, the motor may be energized during first intervals T1 (FIG. 12) of one second that are separated by second intervals T2 of two seconds during which the motor is not energized. If, as part of the selection of the autopulse mode, the operator programs a run time then pulsing of the motor terminates after the programmed time interval has elapsed. If a programmed run time is not selected then the pulsing of the motor continues until the operator actuates the OFF switch 16.

Assuming the blender is off, the autopulse mode with no programmed run time is selected by actuating the ON switch 14 and then actuating the PULSE switch 30. To select the autopulse mode with programmed run time the operator actuates in sequence the ON switch, one of the speed selection switches ⅛–7/14 and then the PULSE switch. Actuation of the ON switch causes power to be applied to the controller 60 and the microprocessor in the controller begins executing the Start routine (FIG. 5) as previously described.

Figure 10A:
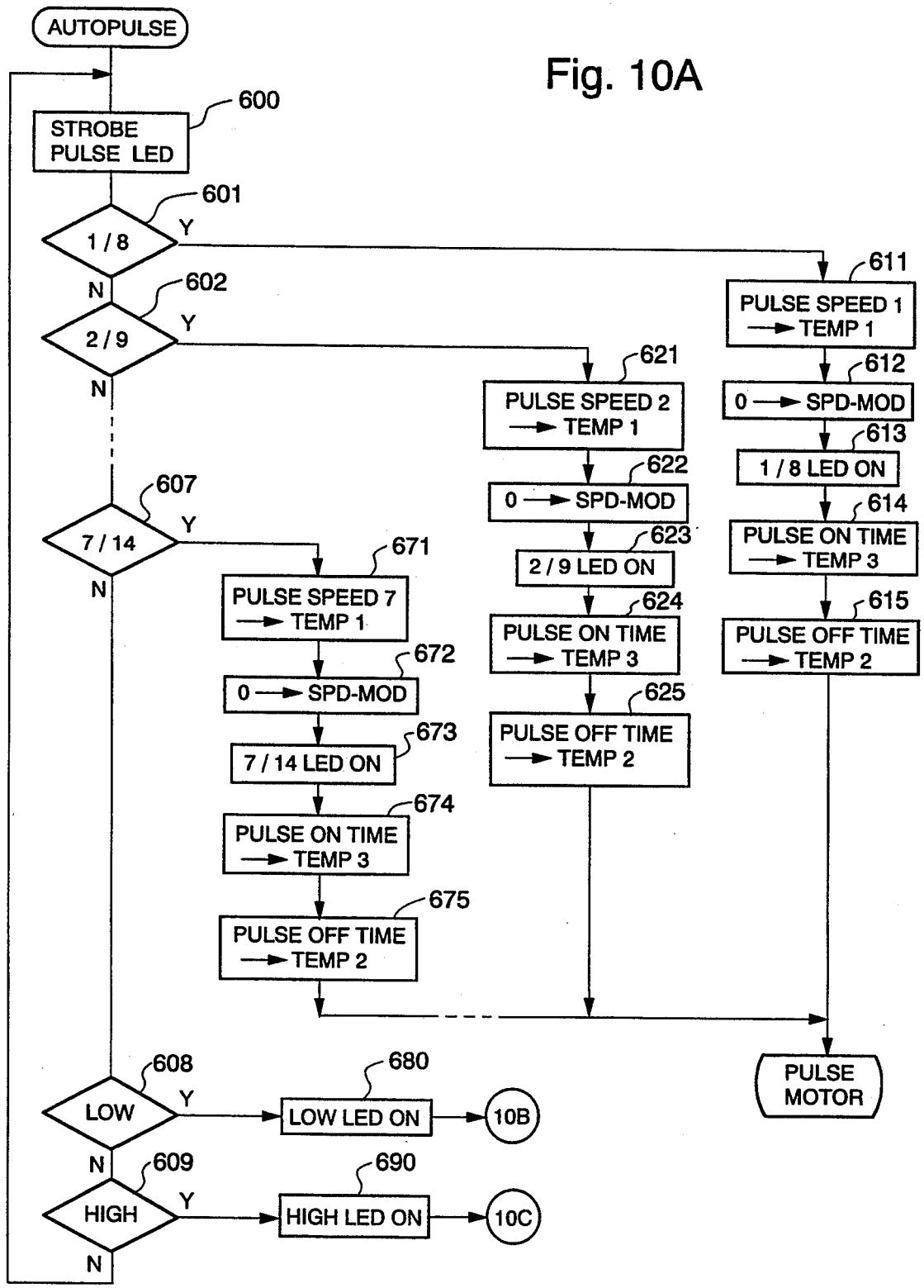
FIGS. 10A, 10B and 10C together comprise an Autopulse routine.
Figure 10B:
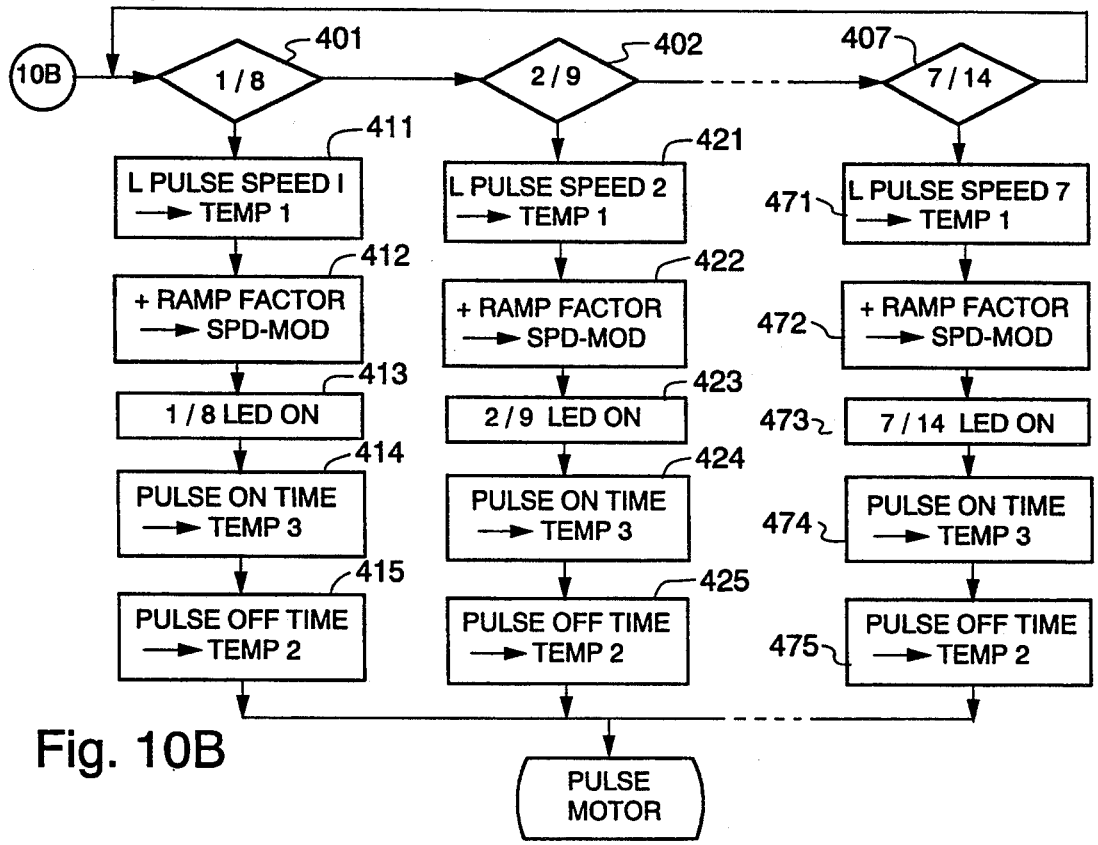
Figure 10C:
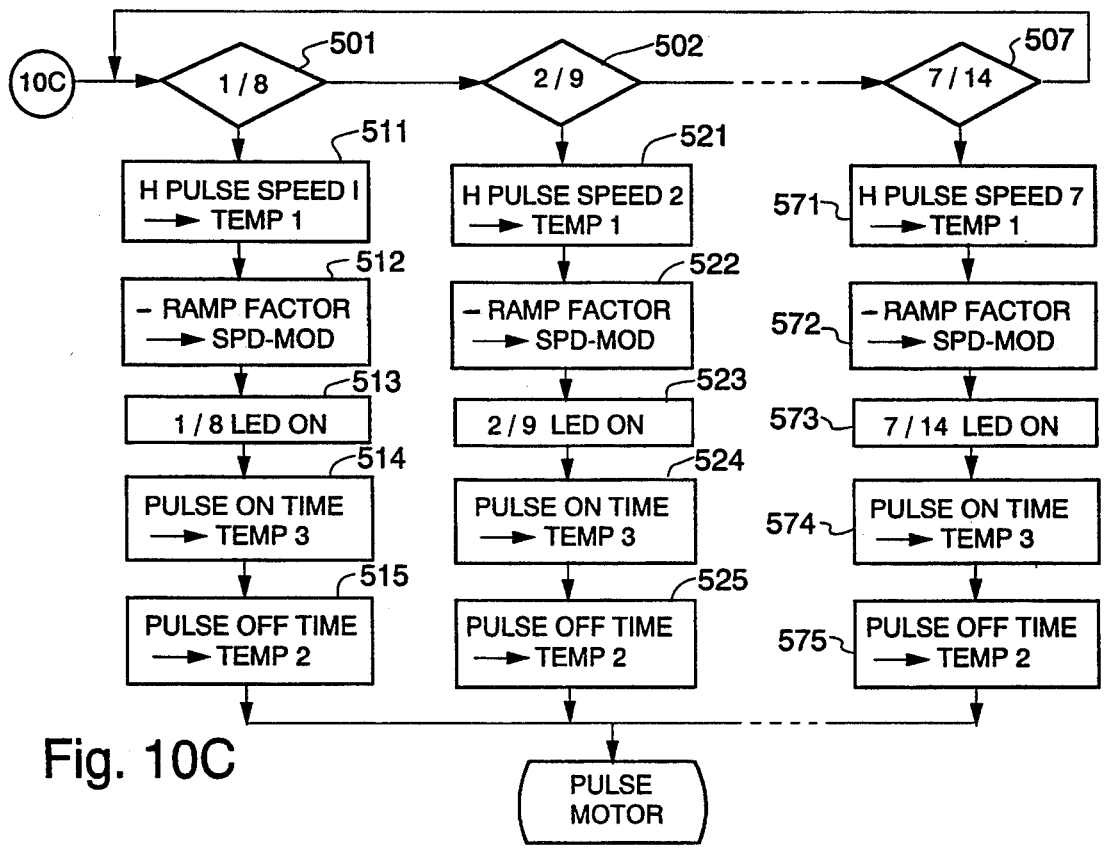

If the operator next actuates the PULSE switch 30, actuation of the switch is detected at step 120 (FIG. 5) and the program branches to the Autopulse routine of FIGS. 10A–10C without a programmed run time. On the other hand, if one of the speed selection switches ⅛–7/14 is actuated before the PULSE switch 30, the speed selection switch actuation causes RUN_TIME_CTR to be loaded (step 103, . . . . or 115) with a run time corresponding to the actuated switch. Then, when the PULSE mode switch is actuated the program branches from step 120 to the Autopulse routine with the programmed run time stored in RUN_TIME CTR.

The Autopulse routine is entered at step 600 (FIG. 10A) where the PULSE LED 31 is strobed. Next, steps 601, 602, . . . . 601, 608 and 609 are executed to see if one of the speed selections switches ⅛–7/14, the HIGH switch 18, or the LOW switch 20 is actuated. If no switch is actuated, the program loops back to step 600. Thus, the PULSE LED 31 is repeatedly strobed at step 600 as the loop is repeatedly executed thereby visually indicating to the operator that the autopulse mode is selected.

With regard to FIG. 10A, it should be understood that between steps 602 and 607 are additional steps which test speed selection switches 3/10–6/13, each of these steps providing a branch to program steps like those shown for the tests of the ⅛, 2/9 and 7/14 switches.

The drive motor 40 may be energized in one of three different patterns in the autopulse mode. The actual energization of the motor takes place during execution of a Pulse Motor routine as subsequently described. However, the parameters for controlling the pattern of energization are selected during execution of the Autopulse routine and are determined by which switch the operator first actuates while the loop comprising steps 600–609 is being executed.

Figure 12:
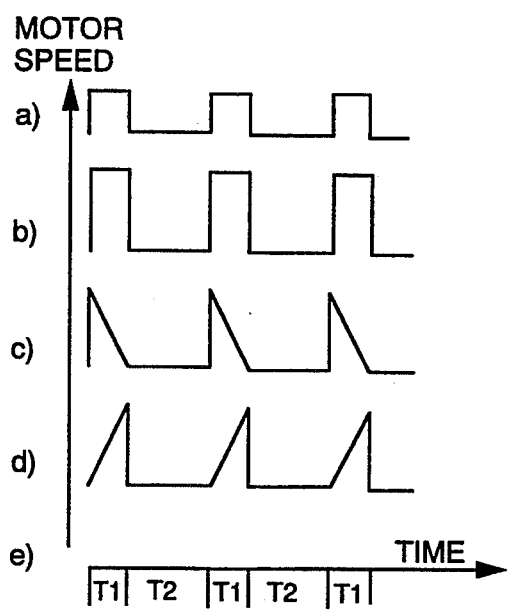
FIGS. 12A-12E are waveform diagrams useful in explaining the invention.

FIG. 12 illustrates three general patterns of energization. In a first pattern the motor is energized to run at a constant speed during intervals T1 with no energization during intervals T2 as depicted by waveform a). The constant speed may be any one of seven speeds. Waveform b) shows a greater motor speed than waveform a).

In a second pattern of energization, the motor is energized to run at a selected first speed at the beginning of an interval T1 and the energization is changed over the interval so that the motor speed is decreased in a ramp-like manner to a second speed at the end of the interval. The second speed may be zero as illustrated by waveform c), or some speed greater than zero. The operator may select one of seven speeds as the first speed. These speeds may, but need not be, different from the speeds used in the first pattern of energization.

In a third pattern of energization the energization of the motor is changed over each interval T1 so that it increases from a first speed at the beginning of the interval to a second speed at the end of an interval. The first speed may be zero as illustrated by waveform d) or some speed greater than zero. The operator may select one of seven speeds as the second speed. These speeds may be, but need not be, different from the speeds used in the first and second patterns of energization.

Figure 13B:
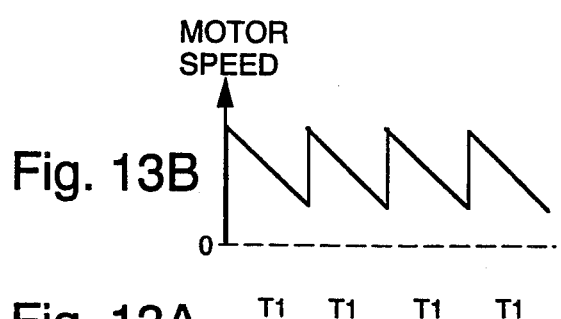
FIGS. 13A and 13B illustrate a pulse mode of motor energization wherein the motor is continuously energized at at least a minimum speed.
Figure 13A:
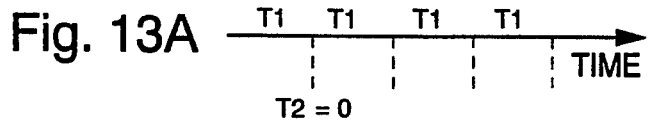

Although, for simplicity, FIG. 12 shows the intervals T1 and T2 as being constant for all patterns of energization, the intervals may vary not only between the patterns of energization but also between the selected speeds within a given pattern. In an extreme case, the interval T2 may be zero as depicted in FIG. 13a. Assuming the above-described second pattern of motor energization is selected, the waveform of FIG. 13b illustrates a possible resulting motor speed pattern wherein the motor speed ramps down from a first speed to a second speed which is not zero, then returns to the first speed.

The parameters for controlling energization of the motor include an "on time" and an "off time" value which determine the intervals T1 and T2, respectively, a speed value (actually a representation of the delay D) and a speed modification value. These values are stored in ROM and cannot be changed by the operator. The operator controls selection of a particular set of these values by actuating a switch or switches to sequence the program through the Autopulse routine.

If, while the program is executing the loop comprising steps 600–609 (FIG. 10A), the operator actuates one of the speed selection switches ⅛–7/14, parameters are selected for energizing the motor according to the first energization pattern illustrated by waveforms a) and b) of FIG. 12. Assume for example that the operator actuates the ⅛ switch. Actuation of the switch is detected at step 601 and the program branches to step 611 where the ROM is addressed to read therefrom a value representing a delay D (FIG. 3) which will result in the motor being energized at pulse speed 1. This value, henceforth referred to as the speed value, is read from ROM and stored in a RAM location TEMP1.

Next, at step 612, the value zero is set into RAM location SPD_MOD. The value in SPD_MOD is used to control the rate at which the selected speed is modified during each interval T1. As shown by waveforms a) and b) of FIG. 12, the motor speed is not modified during intervals T1 hence entry of the value zero into SPD_MOD.

At step 613 the controller begins outputting a signal at its pin 7 to energize the ⅛ LED 32, thereby visually indicating to the operator that speed 1 is selected.

At steps 614 and 615 the ROM is accessed twice to read therefrom two values representing the on-time and off-time intervals T1 and T2. These values are saved at RAM locations TEMP3 and TEMP2, respectively. An exit is then made to the Pulse Motor routine described below.

If, instead of actuating the ⅛ switch, the operator actuates one of the other speed selection switches, five steps corresponding to steps 611-615 are executed. For example, if the 2/9 or 7/14 switch is actuated the program detects the actuation at step 602 or 607, respectively, and executes steps 621-625 or 671-675, respectively, before exiting to the Pulse Motor routine. As previously noted, FIG. 10A does not show the test of the 3/10-6/13 switches nor the branch steps, corresponding generally to steps 611-615, provided for each switch test.

Parameters for controlling energization of the drive motor according to the second energization pattern may be read from the ROM if the LOW switch 20 is actuated while the program is executing the loop comprising steps 600-609. Actuation of the switch is detected at step 608. The program turns the LOW LED 21 on at step 680 and moves to step 401 in FIG. 10B where it enters a loop comprising steps 401, 402, . . . 407. This loop is repeatedly executed and tests the status of the speed selection switches ⅛-7/14 until one of the switches is actuated. Depending on which switch is actuated, the detection occurs at step 401, 402, . . . 407, respectively, and a branch is made to execute five steps 411-415, 421-425, . . . 471-475, respectively, before an exit is made to the Pulse Motor routine.

A comparison of FIGS. 10A and 10B shows the similarity between steps 611-615, 621-625 and 671-675 and steps 411-415, 421-425 and 471-475, respectively. The primary distinction is that in FIG. 10B, a positive number representing the ramp factor, i.e. the rate at which the motor speed is to be increased during intervals T1 (FIG. 12D), is entered into SPD_MOD at step 412, 422, . . . or 472.

If the HIGH switch 18 is actuated while the program Is executing the loop comprising steps 601-609, parameters are read from ROM to control energization of motor 40 according to the third pattern of energization shown in FIG. 12C. Actuation of the switch is detected at step 609, the HIGH LED 19 is turned on at step 690, and the program advances to step 501 (FIG. 10C).

In view of the similarity between the steps illustrated in FIG. 10C and those illustrated in FIGS. 10A and 10B, the operations which take place in the illustrated steps of FIG. 10C are obvious. The main distinction is that the ramp factor loaded into SPD_MOD at step 512, 522, . . . . or 572 is a negative number so that the motor speed is decreased over each interval T1 as subsequently explained.

Pulse Motor Routine

Figure 11:
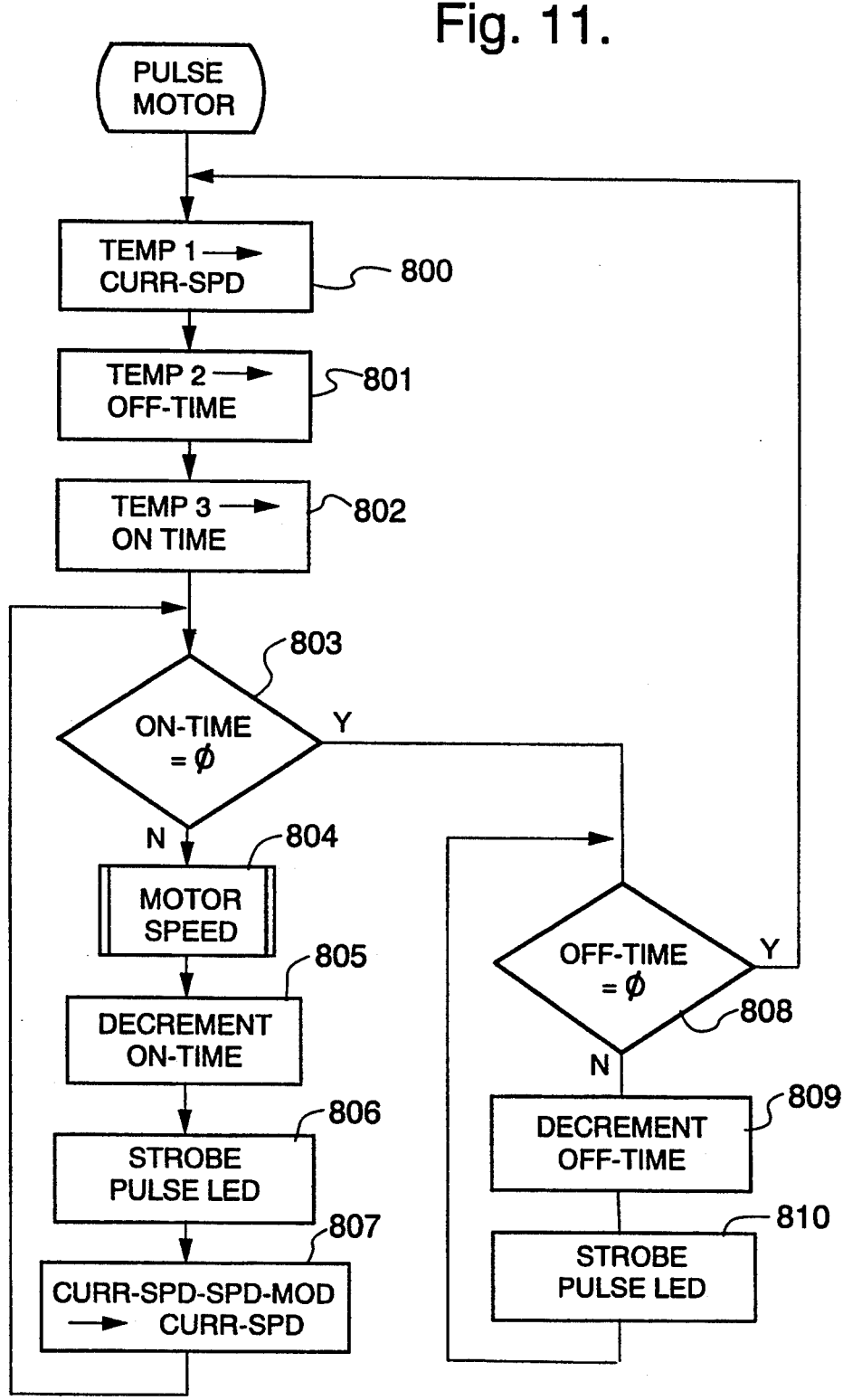
FIG. 11 illustrates the Pulse Motor routine.

The Pulse Motor routine (FIG. 11) is entered only from the Autopulse routine. Its purpose is to toll the on and off periods T1 and T2, adjust the motor speed value according to the ramp factor stored in SPD_MOD so that the motor speed may vary during the intervals T1 that the motor is energized, and call the Motor Speed subroutine to energize the motor.

At step 800 the microprocessor transfers the motor speed value entered into TEMP1 at step 411, 421, . . . 471, 511, 521, . . . 571, 611, 621, . . . or 671 into location CURR_SPD. At steps 801 and 802 the values representing the durations of the periods the motor is to be energized or not energized are transferred from TEMP3 and TEMP2 to locations ON_TIME and OFF_TIME, respectively.

Step 803 tests the value in ON_TIME to see if the period for energizing the motor 40 has expired. Assuming it has not, the Motor Speed routine (FIG. 4) is called at step 804 to energize the motor for one AC cycle. During the execution of the Motor Speed subroutine the value in CURR_SPD controls the phase angle at which triac 42 fires, thus determining the speed of the motor.

Upon completion of the Motor Speed subroutine the program returns to the Pulse Motor routine where, at step 805, the value in ON_TIME is decremented. The PULSE LED 31 is then strobed at step 806 to visually signal the operator that the blender is operating in the pulse mode.

At step 807 the value in SPD_MOD is subtracted from the value in CURR_SPD and the result saved at CURR_SPD. The program then loops back to step 803 and the loop comprising steps 803-807 is executed again. This continues until an execution of step 805 decrements ON_TIME to zero. On the next following execution of step 803, the test for a zero value in ON_TIME proves true and the routine branches to step 808 thus ending the first on-time interval T1 and beginning a first off-time interval T2.

At step 808, the value in OFF_TIME is tested for zero and if the value is not zero it is decremented at step 809. The PULSE LED is then strobed at step 810 before the program loops back to step 808.

The loop comprising steps 808-810 is repeatedly executed until an execution of step 809 decrements OFF_TIME to zero. On the next following execution of step the test of OFF_TIME proves true and the program branches back to step 800 thus ending the interval T2 and beginning a new interval T1.

The Pulse Motor routine is then repeated as described above until the operator actuates the OFF switch 16 or, if the operator has initiated a programmed run time, until the programmed time, tolled in the Motor Speed subroutine, has expired.

The energization of motor 40 during execution of the loop comprising steps 803-808 is determined by the speed, off-time, on-time and speed ramp factor values loaded into TEMP1, TEMP2, TEMP3 and SPD_MOD during execution of the Autopulse routine of FIGS. 10A-10C. Assume that after entering the Autopulse routine the operator first actuates the speed selection switch ⅛. Since this causes a zero value to be entered in SPD_MOD at step 612, the speed value, transferred to CURR_SPD at step 800, is not changed during each execution of Step 807 of the Pulse Motor routine Since the speed value actually represents the angle of firing of triac 42, the triac is fired at the same phase each time the Motor Speed subroutine is executed at step 804 and the motor 40 is driven at constant speed as illustrated by waveform a) in FIG. 12.

If the operator had actuated one of the switches 2/9-7/14 rather than switch ⅛, the angle of firing would occur earlier during each interval T1 resulting in a higher motor speed during intervals T1 as represented by waveform b) of FIG. 12 Because the ramp factor is still zero, the angle of firing is the same during each AC cycle occurring during interval T1 so that the speed is constant during each interval.

Because the speed value actually represents the delay D (FIG. 3) in firing the triac 42, the speed value varies inversely with the motor speed it produces. The smaller the speed value is, the shorter the delay D, thus resulting in more energization current to the drive motor and a higher motor speed. If the second pattern of motor energization is selected so that a positive ramp factor is loaded into SPD_MOD at step 412, 422, . . . or 472, then successive subtractions of the positive value from CURR_SPD at step 807 results in a progressively smaller value or CURR_SPD so that the triac firing delay D decreases thereby giving a progressively faster speed during each interval T1 as shown in FIG. 12D. Conversely, if the pattern of energization represented in FIG. 12C is selected so that a negative ramp factor is loaded into SPD_MOD at step 512, 522, . . . . or 572, then successive subtractions of the negative value from CURR_SPD results in a progressively larger value of CURR_SPD so that the triac firing delay increases thereby giving a progressively decreasing speed during each interval T1.

There is no programmed exit directly from the Pulse Motor routine. If no run time has been programmed, pulsing of the motor continues until the operator actuates the OFF switch. If a run time has been programmed, RUN_TIME_CTR is tested at step 95 and decremented at step 96 during each execution of the Motor Speed subroutine when it is called at step 804. When the time expires, the program returns to the Start routine shown in FIG. 4.

In summary, the present invention provides a control system for controlling energization of a blender or the like drive motor in a wide variety of modes and speeds. The control system requires fewer manual switches than the prior art and avoids the use of rotary selection switches while providing a wide selection of operating modes and speeds. Run time may programmed for continuous or pulsed modes of operation. Automatic pulsing at any one of seven speeds relieves the operator of the burden of manually actuating the switches to control motor pulsing. Furthermore, the automatic pulsing may be carried out in any one of three patterns of energization programmable by the operator.

While a preferred embodiment of the invention has been described in specific detail for purposes of illustrating the principles of the invention, it will be understood that various modifications and substitutions may be made in the described embodiment without departing from the spirit and scope of the invention as defined by the appended claims.

I claim:

1. A blender or the like comprising:
   a drive motor;
   gating means connected in series with said drive motor across an AC voltage source, said gating means having an on stale permitting an energizing current to flow through said drive motor and an off state blocking current flow through said drive motor, said gating means assuming said off state each time the AC voltage is zero;
   a zero-crossing detector for producing an output signal at each zero voltage crossing of said AC voltage;
   a plurality of manually actuated switch means comprising a pulse mode switch, speed range selection switch means for selecting one of N speed ranges, and M speed selection switches; and,
   a controller including,
      a memory storing a plurality of delay values representing delay intervals, said memory having at least N×M addressable locations for storing N×M values representing delay intervals;
      first means responsive to manual actuation of selected ones of said switch means for selecting one of said values;
      second means for tolling a selected delay interval represented by the selected one of said delay values and turning said gating means on at the end of the selected delay interval;
      third means for sensing said output signals and initiating operation of said second means each time said zero-crossing detector senses a zero voltage crossing; and,
      sequence control means for sensing said switch means and enabling said first means, said sequence control means being responsive to actuation of said speed range selection switch means, said pulse mode switch and one of said selection switches, in sequence, for repeatedly sensing said switch means and enabling said first means only so long as one of said speed selection switches is actuated.

2. A blender comprising:
   a drive motor;
   gating means connected in series with said drive motor across an AC voltage source, said gating means having an on state permitting an energizing current to flow through said drive motor and an off state blocking current flow through said drive motor, said gating means assuming said off state each time the AC voltage is zero;
   a zero-crossing detector for producing an output signal at each zero voltage crossing of said AC voltage;
   a plurality of manually actuated switch means including a pulse mode switch, a high and a low speed range selection switch and M speed selection switches; and,
   a controller including,
      a memory storing 2M delay values representing delay intervals;
      first means responsive to manual actuation of selected ones of said switch means for selecting one of said values, said first means including means for selecting one of said delay values depending on which of said speed range selection and speed selection switches are actuated;
   second means for tolling a selected delay interval represented by the selected one of said delay values and turning said gating means on at the end of the selected delay interval;
   third means for sensing said output signals and initiating operation of said second means each time said zero-crossing detector senses a zero voltage crossing; and,
   sequence control means for sensing said switch means and enabling said first means, said sequence control means including means for repetitively sensing said pulse mode, high and low speed range selection and speed selection switches, said sequence control means further including means responsive to the sensed sequence of actuation of said switches for controlling said first and third means.

3. A blender as claimed in claim 2 wherein said sequence control means includes means responsive to actuation, in sequence, of one of the high and low speed range selection switches, the pulse mode switch and one of the speed selection switches for repeatedly enabling said first and third means only so long as said one speed selection switch is actuated.

4. A blender as claimed in claim 2 wherein said sequence control means includes means responsive to actuation, in sequence, of one of said high and low speed range selection switches and one of the speed selection switches for enabling said first means a single time and repeatedly enabling said third means so that said motor is energized even after actuation of said one speed selection switch is terminated.

5. A blender or the like comprising:
a drive motor;
gating means connected in series with said drive motor across an AC voltage source;
a memory for storing values representing motor speeds, on-time values and off-time values;
speed switch means and a pulse mode switch;
selection means responsive to actuation of said pulse mode switch followed by actuation of said speed switch means for selecting from said memory a motor speed value, an on-time value and an off-time value;
on-time control means responsive to a selected on-time value and motor speed value for enabling said gating means for on-time intervals represented by the selected on-time value; and,
off-time control means responsive to a selected off-time value for disabling said gating means for off-time intervals represented by the selected off-time value;
said on-time control means enabling said off-time control means at the end of each on-time interval and said off-time control means enabling said on-time control means at the end of each off-time interval.

6. A blender of the like as claimed in claim 5 wherein said speed selection means comprise high and low speed range selection switches and a plurality of speed selection switches and said memory stores a plurality of speed modification values, said selection means being responsive to actuation said pulse mode switch followed by actuation of any one of said high and low speed range selection and speed selection switches for selecting one of said speed modification values together with a motor speed value, an on-time value and an off-time value.

7. (amended) A blender as claimed in claim 6 and further comprising means for repeatedly modifying the selected motor speed value by the selected speed modification value during each on-time interval whereby the speed of the motor is varied during each on-time interval according to the speed modification value.

8. A blender as claimed in claim 7 wherein said selection means is responsive to actuation of said pulse mode switch followed by actuation of one of said speed selection switches to select a speed modification value of zero.

9. A blender as claimed in claim 7 wherein said selection means is responsive to actuation in sequence, of said pulse mode switch, said low speed range selection switch and one of said speed selection switches for selecting a speed modification value which, when used to modify said motor speed value, causes an increase in motor speed over each on-time interval.

10. A blender as claimed in claim 7 wherein said selection means is responsive to actuation in sequence, of said pulse mode switch, said high speed range selection switch and one of said speed selection switches for selecting a speed modification value which, when used to modify said motor speed value, causes a decrease in motor speed over each on-time interval.

11. A blender as claimed in claim 8 and further comprising:
a zero-crossing detector for detecting zero crossings of the AC voltage and producing an output signal at each crossing;
means responsive to the detector output signals and the modified speed values for tolling delay intervals and enabling said gating means at the end of each tolled delay interval, said gating means being disabled by said AC voltage each time it reaches zero volts.

12. A blender as claimed in claim 9 and further comprising:
a zero-crossing detector for detecting zero crossings of the AC voltage and producing an output signal at each crossing;
means responsive to the detector output signals and the modified speed values for tolling delay intervals and enabling said gating means at the end of each tolled delay interval, said gating means being disabled by said AC voltage each time it reaches zero volts.

13. A blender as claimed in claim 10 and further comprising:
a zero-crossing detector for detecting zero crossings of the AC voltage and producing an output signal at each crossing;
means responsive to the detector output signals and the modified speed values for tolling delay intervals and enabling said gating means at the end of each tolled delay interval, said gating means being disabled by said AC voltage each time it reaches zero volts.

14. A blender comprising:
on and off switches;
high and low speed range selection switches;
a plurality of speed selection switches;
a drive motor;
first means responsive to actuation of said on switch followed by actuation of one of said speed selection switches for selecting an interval of time during which said drive motor is to be energized;
second means responsive to actuation of one of said speed range selection switches followed by actuation of one of said speed selection switches for energizing said motor for the selected interval of time at a speed determined by which one of the speed selection switches is actuated after actuation of said one speed range selection switch.

15. A blender as claimed in claim 14 wherein said second means is responsive to said first means or said off switch for terminating energization of said drive motor.

16. A blender as claimed in claim 14 and further comprising:
a pulse mode switch; and,
third means responsive to actuation, in sequence of one of said speed range selection switches, said pulse mode switch and one of said speed selection switches for energizing said drive motor until no speed selection switch is actuated or until said motor has been energized for the selected interval of time.

17. A blender comprising:
a drive motor;
a manually actuated mode selection switch;

a plurality of speed control switches;

memory means for storing a set of on-time values, a set of off-time values and a set of speed values;

control means for controlling said drive motor, said control means including,
- first means responsive to actuation of said mode selection switch and at least one of said speed control switches for reading from said memory means one of said on-time values, one of said off-time values and one of said speed values;
- second means responsive to said memory means for repeatedly and alternately tolling on-time intervals T1 and off-time intervals T2 represented by the on-time and off-time values read from said memory; and,
- third means responsive to said second means for applying an energizing current to said motor throughout each of said intervals T1, said energizing current being determined by the speed value read from said memory means.

18. A blender as claimed in claim 17 wherein:
said memory means includes means for storing a set of speed modification values,
said first means includes means for reading a speed modification value from said memory means for each speed value read therefrom; and,
means for repeatedly modifying said speed value by said speed modification value during each of said intervals T1 whereby said energizing current varies during each of said intervals T1.

19. A blender as claimed in claim 17 wherein said energizing current comprises a portion of each half cycle of an alternating current, said portion being controlled by said third means in response to the speed value read from said memory means.

* * * * *

UNITED STATES PATENT AND TRADEMARK OFFICE
CERTIFICATE OF CORRECTION

PATENT NO. : 5,347,205
DATED : September 13, 1994
INVENTOR(S) : Clinton E. Piland It is certified that error appears in the above-identified patent and that said Letters Patent is hereby corrected as shown below:

Column 1, line 6, delete "or the like";
Column 2, line 27, delete "or the like";
Column 3, line 52, delete "or the like";
Column 7, line 62, change "Dower" to --power--;
Column 10, line 19, after "turned" insert --off--;
Column 16, line 34, after "step" insert --808--;
Column 17, lines 29-30, delete "or the like";
      claim 1, line 50, delete "or the like";
      claim 1, line 54, change "stale" to --state--;
Column 19, claim 5, line 11, delete "or the like";
      claim 6, line 36, delete "of the like";
      claim 7, line 47, delete "(amended)".

Signed and Sealed this

Ninth Day of November, 1999

Q. TODD DICKINSON

Attest:

Attesting Officer

Acting Commissioner of Patents and Trademarks